(12) United States Patent
Ochiai

(10) Patent No.: US 7,171,677 B1
(45) Date of Patent: Jan. 30, 2007

(54) BROADCAST STORING AND DISPLAYING APPARATUS AND VIDEO APPARATUS

(75) Inventor: Katsuhiro Ochiai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/257,209

(22) Filed: Feb. 25, 1999

(30) Foreign Application Priority Data

Feb. 25, 1998 (JP) .............................. 10-043463

(51) Int. Cl.
*H04N 7/18* (2006.01)
*H04N 9/79* (2006.01)
*H04N 7/16* (2006.01)

(52) U.S. Cl. ......................................... 725/80; 386/35
(58) Field of Classification Search ................. 725/78, 725/80, 82, 85, 134, 133, 139, 140, 151, 725/153, 74; 709/223, 224
See application file for complete search history.

(56) References Cited

U.S. PATENT DOCUMENTS

| | | | | |
|---|---|---|---|---|
| 4,808,992 A * | 2/1989 | Beyers et al. | .......... | 340/825.24 |
| 4,855,730 A | 8/1989 | Venners et al. | | |
| 4,885,803 A * | 12/1989 | Hermann et al. | .......... | 359/148 |
| 4,887,204 A * | 12/1989 | Johnson et al. | ................ | 707/10 |
| 4,920,432 A * | 4/1990 | Eggers et al. | .................. | 386/96 |
| 5,054,022 A * | 10/1991 | van Steenbrugge | .......... | 370/360 |
| 5,457,446 A | 10/1995 | Yamamoto | | |
| 5,500,794 A * | 3/1996 | Fujita et al. | ................... | 700/83 |
| 5,579,523 A * | 11/1996 | Tanaka | ........................ | 710/200 |
| 5,598,278 A * | 1/1997 | Tanaka et al. | ................. | 386/96 |
| 5,666,363 A * | 9/1997 | Osakabe et al. | ............ | 370/426 |
| 5,675,831 A * | 10/1997 | Caputo | ......................... | 710/10 |
| 5,802,017 A * | 9/1998 | Sato et al. | ...................... | 369/2 |
| 5,822,528 A * | 10/1998 | Amano | ........................ | 725/103 |
| 5,883,621 A * | 3/1999 | Iwamura | ....................... | 725/37 |
| 5,935,217 A * | 8/1999 | Sakai et al. | .................. | 709/249 |
| 6,085,019 A * | 7/2000 | Ito et al. | ........................ | 386/52 |
| 6,137,539 A * | 10/2000 | Lownes et al. | ............. | 348/569 |
| 6,157,645 A * | 12/2000 | Shobatake | ............. | 370/395.41 |
| 6,175,860 B1 * | 1/2001 | Gaucher | ...................... | 709/208 |
| 6,188,397 B1 * | 2/2001 | Humpleman | .................. | 725/80 |
| 6,202,210 B1 * | 3/2001 | Ludtke | ......................... | 725/20 |

FOREIGN PATENT DOCUMENTS

| | | |
|---|---|---|
| EP | 0 637 157 | 2/1995 |
| JP | 2-71447 | 3/1990 |
| JP | 5-94652 | 4/1993 |
| JP | 7-75029 | 3/1995 |

(Continued)

*Primary Examiner*—John Miller
*Assistant Examiner*—Dominic Saltarelli
(74) *Attorney, Agent, or Firm*—Foley & Lardner LLP

(57) ABSTRACT

A broadcast storing and displaying apparatus including a network, a network management apparatus for managing the network, and plural types of video apparatuses connected to the network, wherein each of the plural types of video apparatuses transmits the state thereof to the network, the network management apparatus stores the states of the plural types of video apparatuses, and each of the plural types of video apparatuses inquires about the states of the other video apparatuses to the network management apparatus and then determines a video apparatus to be a communication partner on the basis of the states of the other video apparatuses which are obtained from the network management apparatus.

21 Claims, 12 Drawing Sheets

FOREIGN PATENT DOCUMENTS

| | | |
|---|---|---|
| JP | 8-47058 | 2/1996 |
| JP | 8-56352 | 2/1996 |
| JP | 8-79638 | 3/1996 |
| JP | 9-163258 | 6/1997 |
| JP | 9-214935 | 8/1997 |
| JP | 9-261550 | 10/1997 |
| JP | 9-270965 | 10/1997 |
| JP | 9-297946 | 11/1997 |
| JP | 9-322112 | 12/1997 |
| WO | WO 97/49057 | 12/1997 |
| WO | WO 98/59282 | 12/1998 |

* cited by examiner

F I G. 11
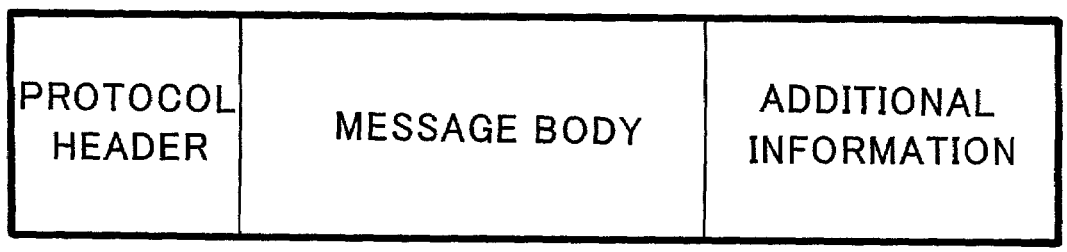

BROADCAST STORING AND DISPLAYING APPARATUS AND VIDEO APPARATUS

BACKGROUND OF THE INVENTION

1. Field of the Invention

The present invention relates to a broadcast storing and displaying apparatus.

2. Description of the Prior Art

FIG. 12 shows a conventional broadcast storing and reproducing method.

In the conventional method, an electromagnetic signal of a broadcast program received by antenna 101 is converted to an electronic signal and demodulated by reception apparatus 104 in video deck 102 and then stored in storing apparatus 105 in video deck 102. Further, an output of storing apparatus 105 in video deck 102 is input through a video cable to displaying apparatus 103 such as TV for displaying the broadcast program.

However, in order to perform the broadcast storing and reproducing method (i.e., in order to store broadcast programs and reproduce the broadcast programs thus stored) in the prior art, it is necessary to exchange a video cassette serving as a broadcast storing medium to another video cassette as occasion demands. Further, when plural broadcast storing apparatuses are provided, the wiring between these storing apparatuses and the reproducing apparatus becomes complicated. In addition, a user must determine a broadcast storing apparatus used to record a broadcast program and a broadcast storing apparatus used to reproduce a broadcast program when plural storing apparatuses are provided.

SUMMARY OF THE INVENTION

An object the present invention is to provide a broadcast storing and reproducing apparatus which can automatically select a video apparatus from plural and various video apparatus in response to a user's request.

According to a first aspect of the present invention, there is provided a broadcast storing and displaying apparatus including: a network; a network management apparatus for managing the network; and plural types of video apparatuses connected to the network, wherein each of the plural types of video apparatuses transmits the state thereof to the network, the network management apparatus stores the states of the plural types of video apparatuses, and each of the plural types of video apparatuses inquires about the states of the other video apparatuses to the network management apparatus and then determines a video apparatus to be a communication partner on the basis of the states of the other video apparatuses which are obtained from the network management apparatus.

According to a second aspect of the present invention, there is provided a broadcast storing and displaying apparatus which comprises: a network; and plural types of video apparatuses connected to the network, wherein each of the plural types of video apparatuses inquires about the states of the other video apparatuses through the network to the other video apparatuses and then determines a video apparatus to be a communication partner on the basis of the states of the other video apparatuses which are obtained from the other video apparatuses.

According to a third aspect of the present invention, there is provided a network management apparatus connected to a network to which plural types of video apparatuses are connected, which comprises: means for storing the state of each of the video apparatuses when the video apparatus transmits the state thereof to the network, and means for transmitting the states of the video apparatuses when each of the video apparatuses inquires about the states of the video apparatuses.

According to a fourth aspect of the present invention, there is provided a video apparatus connected to a network to which a network management apparatus for managing the network and plural types of video apparatuses are connected, which comprises: means for transmitting the state thereof to the network, and; means for inquiring about the states of other video apparatuses to the network management apparatus and then determining a video apparatus to be a communication partner on the basis of the states of the other video apparatuses which are obtained from the network management apparatus.

According to a fifth aspect of the present invention, there is provided a video apparatus connected to a network to which plural types of video apparatuses are connected, which comprises: means for transmitting the state thereof to the network, and means for inquiring about the states of other video apparatuses to the other video apparatuses and then determining a video apparatus to be a communication partner on the basis of the states of the other video apparatuses which are obtained from the other video apparatuses.

According to a sixth aspect of the present invention, there is provided a video apparatus connected to a network to which a plurality of other video apparatuses are connected, which comprises: means for transmitting and receiving a message having a protocol header having a transmitter node ID, a transmitter sub node ID, a transmission destination node ID, a transmission destination sub node ID, a request number, a message ID and a message length, and a message body.

The message may further include additional information, and the protocol header may further include an additional information length.

The message may be a common interface message, a component management interface message, a second type component management interface message, a resource management interface message, a pin connection interface message, a second type pin connection interface message, a streaming interface message, a file management interface message, a monitor interface message, a media synchronous interface message, a browser interface message, a recording reservation interface message, a second type recording reservation interface message, a layout interface message, or a layout sub interface message.

According to a seventh aspect of the present invention, there is provided a broadcast receiving and storing apparatus which comprises: a broadcast receiving component for receiving a broadcast program; broadcast storing components for storing broadcast programs; a managing component for managing states of the broadcast storing components; and a network for connecting the broadcast receiving component, the broadcast storing components and the managing component; wherein the broadcast storing components send states thereof to the managing component through the network; and wherein the broadcast receiving component selects one or more broadcast storing components from the broadcast storing components as broadcast storing components which store a program which the broadcast receiving component receives on the basis of states obtained from the managing component through the network.

According to a eighth aspect of the present invention, there is provided a broadcast storing and displaying apparatus which comprises: broadcast storing components for storing broadcast programs; a broadcast displaying component for displaying a broadcast program; a managing component for managing states of the broadcast storing components; and a network for connecting the broadcast storing components, the broadcast displaying component, and the managing component; wherein the broadcast storing components send information on the broadcast programs stored therein to the managing component through the network; and wherein the broadcast displaying component selects one or more broadcast storing components from the broadcast storing components as broadcast storing components which reproduce a program which the broadcast displaying component displays on the basis of states obtained from the managing component through the network.

According to a ninth aspect of the present invention, there is provided a broadcast storing and displaying apparatus which comprises: broadcast storing components for storing broadcast programs; a broadcast displaying component for displaying a broadcast program; and a network for connecting the broadcast storing components, and the broadcast displaying component; wherein the broadcast displaying component selects one or more broadcast storing components from the broadcast storing components as broadcast storing components which reproduce a program which the broadcast displaying component displays on the basis of states obtained from the broadcast storing components through the network.

According to a tenth aspect of the present invention, there is provided a broadcast storing and displaying apparatus which comprises: a network; and video components connected to the network; wherein one of the video component is set in a state waiting for a trigger while other one or more video components are set in a placed state, and the video component set in the state waiting for the trigger sends a message corresponding to the trigger to the other one or more video components set in the placed state and the other one or more video components set in the placed state begin an operation corresponding to the message when the trigger is caused.

BRIEF DESCRIPTION OF THE DRAWINGS

FIG. 11 is a diagram showing a message according to an embodiment of the present invention.

DETAILED DESCRIPTION OF THE PREFERRED EMBODIMENT

A preferred embodiment according to the present invention will be explained hereunder with reference to the accompanying drawings.

Figure 1:
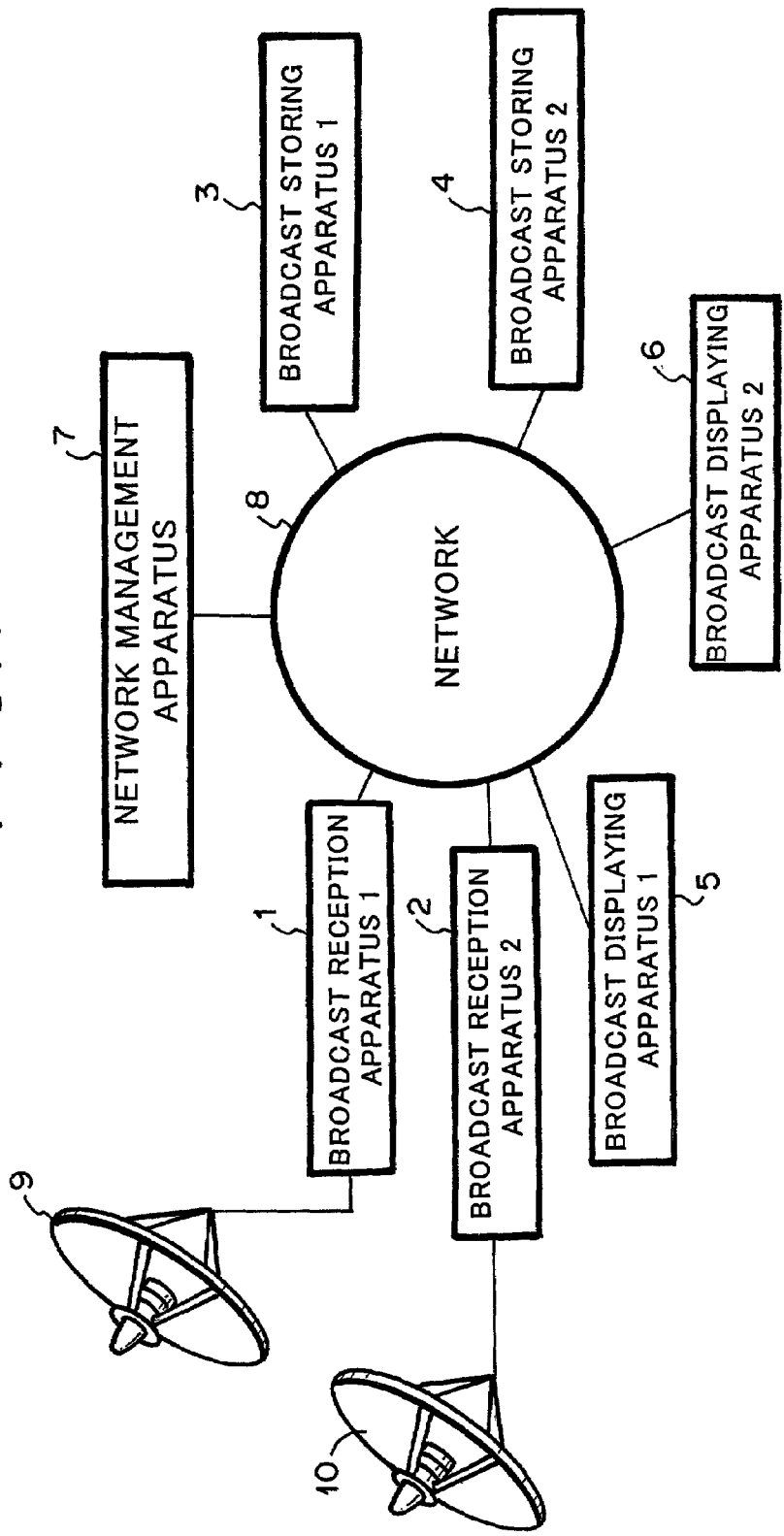
FIG. 1 is a diagram showing the construction of a broadcast storing and displaying apparatus according to an embodiment of the present invention.

FIG. 1 is a diagram showing a broadcast storing and reproducing apparatus according to an embodiment of the present invention.

The broadcast storing and reproducing apparatus of this embodiment comprises broadcast reception apparatuses 1, 2, broadcast storing apparatuses 3, 4, broadcast displaying apparatuses 5, 6, a network management apparatus 7 and network 8 through which the above apparatuses are connected to one another. Broadcast reception apparatuses 1, 2 receive broadcast programs through antennas 9, 10 respectively, and output the broadcast programs to broadcast storing apparatus 3 or 4 through network 8 connected thereto. Broadcast storing apparatuses 3 and 4 store the broadcast programs thus input. The broadcast programs stored in broadcast storing apparatuses 3 and 4 are output to broadcast displaying apparatuses 5 or 6 through network 8, and the broadcast displaying apparatuses 5 and 6 display the pictures of the broadcast programs thus input and output sounds of the broadcast programs thus input. A video apparatus is used as a general term for broadcast reception apparatuses 1, 2, broadcast storing apparatuses 3, 4 and broadcast displaying apparatuses 5, 6. Further, in a broad sense, network management apparatus 7 is also contained in the video apparatus in such sense that it transmits a message to network 8 and receives a message from network 8.

For example, a network which is based on IP (Internet Protocol) or compliant with IEEE1394 is selected as network 8. For example, a large-capacity hard disk is assumed as broadcast storing apparatuses 3 and 4.

Network management apparatus 7 manages information of each apparatus on network 8 connected thereto. The information thus managed includes identification numbers of connected apparatuses, function information of the connected apparatuses and the states of the connected apparatuses. When an apparatus is connected to network 8, the apparatus first notifies its function (for example, functions as a television of NTSC format when the apparatus is a picture displaying apparatus) to network management apparatus 7. Network management apparatus 7 receiving the notification gives the apparatus an identification number so as to assure unity of the apparatus on network 8, and afterwards it manages the identification number and the function information as a pair insofar as the apparatus is connected to network 8.

Further, from the time when an apparatus is connected to network 8 until the time when the apparatus is disconnected from network 8, network management apparatus 7 manages the apparatus in connection with the identification number at any time even when the state of the apparatus varies. That is, when the state of the apparatus is varied, the apparatus notifies the variation of the state to the network together with the identification number thereof, and network management apparatus 7 receives and manages the content of the notification therein.

When any apparatus connected to network 8 makes a request to network management apparatus 7, network management apparatus 7 notifies the functions and the statues of the other apparatuses to the apparatus concerned (hereinafter referred to as "a requesting apparatus"). On the basis of the functions and the states of the other apparatuses thus notified, the apparatus which made the request (i.e., the requesting apparatus) independently determines an apparatus with which the requesting apparatus should communicate so as to perform necessary processing, and then establishes and starts the communication with the apparatus thus determined.

The state to be managed in network management apparatus 7 and notified from/to each apparatus contains information on availability of the apparatus such as "available", "reserved in the future" or "unavailable (and the reason therefor)".

For example, when a broadcast program received by broadcast reception apparatus 1 is required to be stored in currently-available one chose from broadcast storing apparatuses 3 and 4 for 30 minutes, broadcast reception apparatus 1 first requests to network management apparatus 7 a list of apparatuses which are connected to management apparatus 7 on network 8, and checks the list thus received to select an available broadcast storing apparatus 3 (or 4), and then requests to the available broadcast storing apparatus 3 (or 4) thus selected to store the broadcast program for 30 minutes from the moment. In accordance with this operation, for example, even when a large amount of data has been already stored in broadcast storing apparatus 3 and apparatus 3 is impossible to further record data, broadcast storing apparatus 4 is automatically selected to record the broadcast program if broadcast storing apparatus 4 has still a free storing capacity in which data can be further recorded.

Further, network apparatus 7 provides the other apparatuses with information representing broadcast programs which have been already stored in broadcast storing apparatuses 3 and 4 and are available. For example, it provides information representing "programs broadcasted from 19:20, Jan. 7, 1997 to 20:00, Jan. 7, 1997 at 6 ch can be reproduced in and obtained from broadcast storing apparatus 3". This information is used when on the basis of an audience's operation, broadcast displaying apparatus 5 issues to network 8 an inquiry as to whether there is any apparatus in which a program portion broadcasted from 19:30, Jan. 7, 1997 to 19:50, Jan. 7, 1997 at 6 ch are stored and then determines which broadcast storing apparatus should be connected to broadcast display apparatus 5 in order to obtain the program portion.

There are two ways for the above operation.

One way is as follows: When each of broadcast storing apparatuses 3 and 4 is newly connected to network 8 or when it stores a new broadcast program, the information on broadcast programs stored in each of apparatuses 3 and 4 is sent through network 8 to network management apparatus 7 and stored in apparatus 7. Broadcast display apparatus 5 makes a request for a list of the stored broadcast programs or for searching the information on the stored broadcast programs to network management apparatus 7 as occasion demands so as to know which one of broadcast storing apparatuses 3 and 4 stores a desired program.

The other way is as follows: Only broadcast storing apparatuses 3 and 4 hold information on broadcast programs stored in the apparatuses 3 and 4. Broadcast displaying apparatus 5 makes a request for a list of the stored broadcast programs or for searching the information on the stored broadcast programs to all of the broadcast storing apparatuses 3 and 4 as occasion demands so as to known which one of broadcast storing apparatuses 3 and 4 stores a desired program.

According to any of the two ways, it is unnecessary for an audience to pay his/her attention to which one of program storing apparatuses stores his/her desiring broadcast program, and network 8 logically connects a broadcast storing apparatus storing the desired broadcast program with a broadcast displaying apparatus used by the audience on network 8 under self-control, whereby the broadcast program desired by the audience can be reproduced.

Likewise, scene-based categories of programs stored in the broadcast storing apparatus are added to information on the state of broadcast storing apparatuses, and the broadcast storing apparatus for reproducing scenes of the programs which belong to a category desired by the audience can be automatically selected. The categories of the broadcast programs are transmitted while embedded in the vertical blank periods of the video signals of broadcast programs, or transmitted simultaneously with broadcast programs through the Internet, so that the above function can be implemented by providing the broadcast storing apparatus with an apparatus for receiving the program categories thus transmitted.

When an apparatus is newly connected to network 8, the apparatus first notifies information on its owning functions to network management apparatus 7, and network management apparatus 7 gives the newly connected apparatus an identification number to assure unity of the newly connected apparatus on network 8, and afterwards network management apparatus 7 manages the identification number and the function information as a pair insofar as the newly connected apparatus is connected to network 8. A user of the apparatus of this embodiment can add each video apparatus without performing any special setting by himself/herself. For example, it is unnecessary for a user to perform no setting work other than the connection work when a broadcast storing apparatus is newly added to increase the program storing capacity or a broadcast displaying apparatus is added so that different broadcast programs are enabled to be watched at the same time.

The selection of the broadcast storing apparatus was explained in the above. Likewise, the selection of broadcast reception apparatus 1 or 2 and the selection of broadcast displaying apparatus 5 or 6 can be performed in accordance with the states of apparatuses which are held in network management apparatus 7 connected to network 8.

Further, a broadcast transmitting apparatus for transmitting programs to a public network through a telephone line or the like may be added to network 8 or a play-only apparatus such as a CD-ROM driver or DVD may be added to network 8. The broadcast transmitting apparatus and the play-only apparatus are also contained in the video apparatus.

Next, an example of the format of messages which are transmitted on network 8 will be described.

The message is assumed to be based on UDP (User Datagram Protocol).

The message comprises a protocol header, a message body and additional information as shown in FIG. 11. The length of the protocol header is fixed, and the length of each of the message body and the additional information is variable.

The protocol header is used to specify a data transmitter and a data destination. The contents of a message are described in the message body. The additional information is used to associate a node identifier of IEEE1394 used in the protocol header and the message body and IP (Internet Protocol).

The protocol header contains a transmitter node ID, a transmitter sub node ID, a destination ID, a destination sub node ID, a request number, a message ID, a message length and an additional information length.

The transmitter node ID represents the node ID on IEEE1394 of equipment (apparatus) in which a transmitter component exists. The transmitter sub node ID represents the local ID of the transmitter component in the equipment. The destination node ID represents the node ID on IEEE1394 of equipment in which a destination component exists. The destination sub node ID represents the local ID of the destination component in the equipment. The component means a logical constituent unit of software which can be controlled from a program through API (Application Program Interface), and it typically comprises a hardware and a controller therefor. As the components, there are provided a video component comprising VCR and a controller therefor, a monitor component comprising a TV receiver and a controller therefor, etc. The component performs communication using UDP.

The request number is a number with which a requesting component provides each message, and a responding component provides the same request number to a response message, whereby a component making plural requests can identify the correspondence between the response and the request (i.e., which response is associated with which request).

The message length represents the length of the message body, and the additional information length represents the length of the additional information.

The message is classified into a common interface message, a component management interface message, a second type component management interface message, a resource management interface message, a pin connection interface message, a second type pin connection interface message, a streaming interface message, a file management interface message, a monitor interface message, a media synchronous interface message, a browser interface message, a recording reservation interface message, a second type recording reservation interface message, a layout interface message, and a layout sub interface message.

The common interface message is a basic message which can be interpreted by all the components, and a shut-down request, a shut-down response, an existence inquiry, an existence response, a reset request and a reset response belong to a group of the common interface messages. The type of the message is specified by the message ID of the protocol header. A response constant representing response contents is inserted in each type of response, and the response constant is contained in the message body.

The shut-down request is a message requested from the external to finish the component, and the shut-down response is a response to the shut-down request. The existence inquiry is a message confirming whether the component is able to respond, and the existence response is a response to the existence inquiry. When there is no existence response within a predetermined time, an existence-inquiring side regards the component at the inquired side as being in a response-impossible state. The reset request is a message to reset the state of the component and set it to an initial state which is the same as a state just after it is started, and the reset response is a response to the reset request.

A component register request, a component register response, a component register delete request, a component register delete response, a component search request, a component search response, a component connection request, a component connection response, a component connection breaking request and a component connection breaking response belong to a group of the component management interface messages.

When a request belonging to the component management message is output, it is notified while the sort of the interface supported by the component is also contained in the message body. As the sort of the interface, there are provided a resource manager interface (network management apparatus interface), a monitor interface, a recording interface, a layout interface, a browser interface and a file management interface. "Sub-sort" is provided as a subordinate to "sort". No sub-sort is provided to the resource manager. A TV tuner sort and a reproduction sort are provided as sub-sorts which are subordinate to the monitor interface. A TV sort and a recording sort are provided as sub-sorts which are subordinate to the recording interface. A ground wave tuner, a cable TV tuner, a satellite broadcasting tuner, etc. are provided as the TV tuner sort. MPEG1 reproduction, MPEG2 reproduction, motion JPEG reproduction, etc. are provided as the reproduction sort. MPEG1 recording, MPEG2 recording and motion JPEG recording are provided as the recording sort.

The component is registered in the resource manager in response to the component register request. The node ID, the sub node ID, the sort of the interface and the sub-sort of the component to be registered are contained in the message body of the component register request. Plural components can be registered on the basis of the component register request. Further, plural sorts can be registered for the same component, and plural sub-sorts can be registered for the same sort.

The number of registered components, the node IDs and subnode IDs of the registered components, and return values are contained in the message body of the component register response.

The number of components to be deleted, and the node IDs and subnode IDs thereof are contained in the message body of the component register delete request.

The number of deleted components, the node IDs and subnode IDs of the deleted components, and return values are contained in the message body of the component register delete response.

The component search request indicates a component to be searched by combining sorts and sub-sorts with a product-sum logical equation. Therefore, the input number of logical OR, the input number of logical AND, and the pair of the sort and the sub-sort serving as each logical AND input are included in a message body of the component search request.

By setting a condition equation of a combination of the sort and the sub-sort in the message body of the component search request, a component which can perform cable TV reception and MPEG2 decoding can be searched.

The number of components which are conformable to the request, and the node IDs, the subnode IDs, the sorts and the sub-sorts thereof are contained in the message body of the component search response.

A component search request with time assignment, a component lock notification, a component lock response, a component unlock notification, a component unlock response, a component reservation state request, and a component reservation state response belong to a group of the second type component management interface messages.

Because the component search request with time assignment assign components to be searched by combining pairs of a sort and a sub-sort with a product-sum logical equation, the input number of logical OR, the input number of logical AND, and the pair of the sort and the sub-sort serving as each logical AND input are included in a message body of the component search request similarly to the component search request. In addition, the component search request with time assignment comprises a start time expressed by a year, a month, a day, an hour, a minute, and a second, and an end time expressed by a year, a month, a day, an hour, a minute, and a second.

The component lock notification comprises a lock start time expressed by a year, a month, a day, an hour, a minute, and a second, and a lock end time expressed by a year, a month, a day, an hour, a minute and a second. A component sending the component lock notification notifies a destination that the component cannot accept a recording reservation from a lock start time to a lock end time. The component lock notification is a response to the component lock notification and has a response constant. A broadcast storing apparatus can notify that it has no more recording capacity by transmitting the component lock notification with an unlock time having a value of infinite.

The component unlock notification comprises an unlock start time expressed by a year, a month, a day, an hour, a minute, and a second, and an unlock end time expressed by a year, a month, a day, an hour, a minute, and a second. A component sending the component unlock notification notifies a destination that the component can accept a recording reservation from a lock start time to a lock end time. The component unlock response is a response to the component unlock notification and has a response constant.

The component reservation state request is used for requesting state of components each holding a reservation or reservations. The component reservation state response is a response to the component reservation state request and as a response constant, a number of components, a node ID and a sub-node ID of each of the components, a number of reservations for each of the components, a start and end time for each of reservations expressed by a year, a month, a day, an hour, a minute, and a second.

A resource register request, a resource register response, a resource register delete request, a resource register delete response, a resource search request and a resource search response belong to a group of the resource management interface messages. The resource means data which can be referred to from the component. That is, the resource is a broadcast, a file or the like, for example. The resource is provided with a serial number in each component.

The number of resources to be registered, and the serial numbers and the names thereof are contained in the message body of the resource register request. The number of registered resources, the serial numbers thereof, and an error constant are contained in the message body of the resource register response.

The number of resources to be deleted, and the serial numbers and names thereof are contained in the message body portion of the resource register delete request. The number of deleted resources, the serial numbers thereof, and an error constant are contained in the message body of the resource register delete response.

The resource search request is a message for searching the location of the resource, and it is transmitted to the resource manager. The resource to be searched is indicated with URL (Universal (or Uniform) Resource Locator), and the URL is contained in the message body of the resource detection request.

The URL comprises an association, a provider, a data type and a resource ID. The association is a descriptor representing a group assuring the unity of the resource ID which is dependent on the provider. For example, "broadcast" is described in the case of a TV station, and "local" is described in the case of a user local. The provider is a descriptor representing a provider which provides a resource. When the association is "broadcast", it is conformed to a station code defined in Easy Internet Association (EIA). With respect to CAVT, values in a specific range are allocated.

The data type is the type of a resource which is subsequently represented, and it takes a value of "stream" or "nonstream". The resource ID is an identifier of the resource. When the data type is "stream", it represents a recording start time and a recording end time, and when the data type is "nonstream", it mainly represents a recording start time. However, the present invention is not limited to this mode insofar as the unity is assured by each provider.

When a broadcast program is recorded under a specific user environment, the association of URL of the resource thereof is "broadcast", the provider of the resource thereof is a station code defined in EIA, the data type of the resource thereof is "stream", and the resource ID of the resource thereof is a start timestamp and an end timestamp. When a video is distributed by using VOD (Video on demand), the association of URL of the resource thereof is "vod", the provider of the resource thereof is a company identifier of a data provider, the data type of the resource thereof is "nonstream", and the resource ID of the resource thereof is an identifier for assuring the unity by the data provider. When a video is created under a local environment by a user, the association of URL thereof is "local", the provider is any identifier which assures the unity by the user, the data type is "stream", and the resource ID is a start timestamp and an end timestamp.

The resource search response is a response message to the resource search request. The number of resources searched, and the node IDs, subnode IDs, names, start times and end times of these resources are contained in the message body of the resource search response.

A pin direct connection request, a pin direct connection response, a pin connection breaking request and a pin connection breaking response belong to a group of the pin connection interface messages.

The pin direct connection request and the pin direct connection response are messages to prepare an input pin and an output pin in order to perform UDP communication between two components. The pin connection breaking request and the pin connection breaking response are messages to break the connection.

The pin direct connection request start direct negotiation for connection of UDP data communication from a request side to a response side. A connection ID is contained in the message body of this request. The connection ID is a connection number of a pin (a port number of a socket) receiving UDP data.

The pin direct connection response is a response to the pin direct connection request, and the connection ID and an error constant are contained in the message body of this response.

The pin connection breaking request is made to break the pin connection which has been already established. The connection ID is contained in the message body of this request.

The pin connection breaking response is a response to the pin connection breaking request, and a response constant is contained in the message body of this response.

A pin direct connection request with time assignment belongs to a group of the second type pin connection interface messages.

The pin direct connection request with time assignment is equivalent to a pin direct connection request accompanied with a recording reservation start time and recording reservation end time expressed by a year, a month, a day, an hour, a minute, and a second.

A stream control request, a stream control response, a stream stop request, a stream stop response, a stream re-start request and a stream re-start response belong to a group of the streaming interface messages.

The stream control request is a message to adjust the data transmission amount and the data transmission frequency per second of a communication which is made between the request side and the response side, and the stream control response is a response message to the stream control request. The stream stop request is a message to temporarily stop the transmission at the response side, and the stream stop response is a response message to the stream stop request. The stream re-start request is a message to re-start the transmission at the response side under rest, and the stream re-start response is a response message to the stream re-start request.

A connection ID representing a connection number used for data reception at the response-side component, the desired number bytes in data transmission per one transmitting transmission at the request side, the desired frequency of data transmitting transmission per second at the request side, the desired data reception amount per one receiving transmission at the request side, and the desired frequency of data receiving transmission per second at the request side are contained in the message body of the stream control request.

A response constant, the desired number of bytes in transmission per one transmitting transmission at the response side, the desired frequency of data transmitting transmission per second at the response side, the desired data reception amount per one receiving transmission at the response side, and the desired data reception frequency per second at the response side are contained in the message body of the stream control response.

The connection ID is contained in the message body of the stream stop request and the stream re-start request. A response constant is contained in the message body of the stream stop response and the stream re-start response.

A file read-out request, a file read-out response, a file write-in request, a file write-in response, a file list addition request, a file list addition response, a file list deletion request and a file list deletion response belong to a group of the file management interface messages.

The file read-out request is a message requesting to transmit to the request side a resource managed by a file manager (broadcast storing apparatus) at the response side, and the file read-out response is a response message to the file read-out request. The file write-in request is a message for transmitting a resource at the request side to the file manager at the response side, and the file write-in response is a response to the file write-in request. The file list addition request is a message to register a resource into the file manager at the response side, and the file list addition response is a message to the file list addition request. The file list deletion request is a message to delete a resource registered in the file manager at the response side from the registration, and the file list deletion response is a response message to the file list deletion request.

A connection ID and a resource name are contained in the main body of the file read-out request. A response constant is contained in the message body of the file read-out response. A connection ID and URL serving as a resource name registered at the transmission side is contained in the message body of the file write-in request. A response constant is contained in the message body of the file write-in response. The number of resources to be added, internal IDs thereof which are temporary serial numbers in the request-side components thereof and the source names thereof are contained in the message body of the file list addition request. Further, the number of added resources, and the internal IDs thereof and a response constant are contained in the message body of the file list addition response. The number of resources to be deleted, the internal IDs thereof and the names thereof are contained in the message body of the file list deletion request. Further, the number of deleted resources, the internal IDs thereof and a response constant thereof are contained in the message body of the file list deletion response.

A scenario newly-creating request, a scenario newly-creating response, a scenario deletion request, a scenario deletion response, a scene addition request, a scene addition response, a scene deletion request, a scene deletion response, a scene insertion request, a scene insertion response, a scene registration number gaining request, a scene registration number gaining response, a scene gaining request, a scene gaining response, a reproduction start request, a reproduction start response, a reproduction stop request, a reproduction stop response, a reproduction pause (temporary stop) request, a reproduction pause (temporary stop) response, a reproducing position changing request, a reproducing position changing response, a reproduction restart request, a reproduction restart response, a scene shift request, a scene shift response, a reproducing speed changing request, a reproducing speed changing response, a reproduction state gaining request and a reproduction state gaining response belong to a group of the monitor interface messages.

The scenario newly-creating request is a message to newly create a scenario, and the scenario newly-creating response is a response message thereto. Here, the scenario means the overall body from the first to the last of a re-constructed program (a program constructed by combining a part of one or more programs by a user), and this is constructed by plural scenes. The scene means a continuous broadcast portion of the reconstructed program, and it is constructed by plural shots. The shot means a file in which a recorded content exists. The scenario deletion request is a message to delete a scenario, and the scenario deletion response is a response thereto. The scene addition request is a message to add a new scene to the last position of the scenario, and the scene addition response is a response message thereto. The scene deletion request is a message to delete an appointed scene from the scenario, and the scene deletion response is a response message thereto.

The scene insertion request is a message to insert a scene into any place of a scenario, and the scene insertion response is a response message thereto. The scene registration number gaining request is a message to gain the number of scenes registered in the scenario, and the scene registration number gaining response is a response message thereto. The scene gaining request is a message to gain one of scenes arranged in an indicated order, and the scene gaining response is a response message thereto. The reproduction start request is a message to reproduce a created scenario from the beginning, and the reproduction start response is a response message thereto.

The reproduction stop request is a message to stop the scenario under reproduction, and the reproduction stop response is a response message thereto. The reproduction pause request is a message to temporarily stop the scenario under reproduction, and the reproduction temporary stop response is a response message thereto. The reproducing position changing request is a message to change a position of reproduction to that of the appointed time, and the reproducing position changing response is a response message thereto. The reproduction restart request is a message to restart the reproduction of the scenario being stopped or paused, and the reproduction restart response is a response message thereto.

The scene shift request is a message to change the reproducing position of the scenario to the head of an indicated scene, and the scene shift response is a response message thereto. The reproducing speed changing request is a message to change the reproducing speed and the reproducing direction of the scenario, and the reproducing speed changing response is a response message thereto. The reproduction state gaining request is a message to gain the reproduction state of the scenario, and the reproduction state gaining response is a response message thereto.

Nothing may be contained in the message body of the scenario newly-creating request. A response constant and a scenario number which is a registration number internally handled in the monitor component and allocated to the scenario are contained in the message body of the scenario newly-creating response. Further, the scenario number of a scenario to be deleted is contained in the message body of the scenario deletion request. A response constant is contained in the message body of the scenario deletion response. Further, the scenario number of a scenario to which a scene should be added and URL of the scene to be added are contained in the message body of the scene addition request.

Further, a response constant and a scene number which is the order of the registered scene in the scenario are contained in the message body of the scene addition response. The scenario number of a scenario containing a scene to be deleted and the scene number of the scene to be deleted are contained in the message body of the scene deletion request. A response constant is contained in the message body of the scene deletion response.

The scenario number of a scenario to which a scene should be added, a scene number indicating an insertion place of the scene and URL of the scene are contained in the message body of the scene insertion request. A response constant is contained in the message body of the scene insertion response. The scenario number of a scenario of which the number of scenes is required to be gained is contained in the message body of the scene registration number gaining request. The number of scenes contained in the indicated scenario is contained in the message body of the scene register number gaining response. The scenario number of a scenario whose scene is required to be gained, and the scene number of the scene to be gained are contained in the message body of the scene gaining request. A response constant and URL of the gained scene are contained in the message body of the scene gaining response.

The scenario number of a scenario which is required to be reproduced is contained in the message body of the reproduction start request. A response constant is contained in the message body of the reproduction start response. The scenario number of a scenario to be stopped is contained in the message body of the reproduction stop request, a response constant is contained in the message body of the reproduction stop response. The scenario number of a scenario to be temporarily stopped is contained in the message body of the reproduction pause (temporary stop) request, and a response constant is contained in the message body of the reproduction pause response.

A scenario number to which the change of the reproduction position is requested and a jump time are contained in the message body of the reproduction position changing request, and a response constant is contained in the message body of the reproduction position changing response. The scenario number to which the restart of the reproduction is requested is contained in the message body of the reproduction restart request, and a response constant is contained in the message body of the reproduction restart response. The scenario number of a scenario to which a scene shift is requested and a relative scene number of a shift destination are contained in the message body of the scene shift request, and a response constant is contained in the message body of the scene shift response. The scenario number of a scenario to which the change of the reproducing speed is requested and the reproducing speed are contained in the message body of the reproducing speed changing request, and a response constant is contained in the message body of the reproducing speed changing response. The scenario number of a scenario to which the reproduction state is requested is contained in the message body of the reproduction state gaining request, and the current reproduction position and speed which are represented by the response constant, the reproduction state and the time are contained in the message body of the reproduction state gaining response. As the reproduction state, there are provided the following four states: "unspecified state", "under reproduction", "at a stop" and "under pause (temporary stop)".

As the media synchronous interface message, there are provided a trigger setting request, a trigger setting response, a place setting request, a place setting response, a trigger cancel request, a trigger cancel response, a place cancel request, a place cancel response and an ignition notification.

Here, a "place setting" means placing a component in a state in which a component is waiting until ignition occurs and from which the component carries out a specific operation after the ignition occurs.

In order to establish synchronization among plural components, a trigger is set in a component and placed states are created in the other components. The component in which the trigger is set monitors whether a trigger is established, and the components in which the placed state is created waits without carrying out an indicated operation until an ignition notification comes. When the ignition notification comes, each component starts the processing according to the latest message requesting a process. Therefore, when plural messages of requests come before the ignition notification comes, only processing corresponding to the latest message is executed.

The trigger setting request is a message to set a trigger (ignition condition), and the trigger setting response is a response message thereto. The place setting request is a message to set a place, and the place setting response is a response message thereto. The trigger cancel request is a message to cancel a trigger which has been set, and the trigger cancel response is a response message thereto. The place cancel request is a message to cancel a place which has been set, and the place cancel response is a response message thereto.

A message which a triggered component transmits to placed components after ignition occurs may be set in the trigger setting request. Further, a message which is transmitted when ignition occurs may be set in the place setting request.

A trigger (ignition condition), the number of pairs of nodes and subnodes to which an ignition notification is addressed, the node IDs and the subnode IDs thereof and a message to be notified after the ignition are contained in the message body of the trigger setting request. A response constant is contained in the message body of the trigger setting response.

A message which is to be transmitted at the ignition time is contained in the message body of the place setting request, and a response constant is contained in the message body of the place setting response. Nothing may be contained in the message body of the trigger cancel request, and a response constant is contained in the trigger cancel response. Nothing may be contained in the message body of the place cancel request, and a response constant is contained in the message body of the place cancel response. A user-definable message which is required to be notified in connection with ignition is contained in the message body of the ignition notification.

A browser control privilege gaining request, a browser control privilege gaining response, a browser control privilege return request, a browser control privilege return response, a browser page display request and a browser page display response belong to a group of the browser interface messages.

The browser displays program-related information which is transmitted while embedded during the vertical blank periods of the video signal of a broadcast program or transmitted simultaneously with a broadcast program through Internet, and the browser is provided to the displaying apparatus.

The browser control privilege gaining request is a message requesting to start use of a browser component, and the browser control privilege response is a response message thereto. The browser control privilege return request is a message requesting to end use of a browser component, and the browser control privilege return response is a response message thereto. The browser page display request is a message to set URL to be displayed in a browser component, and the browser page display response is a response message thereto.

Nothing may be contained in the message body of the browser control privilege gaining request.

A response constant and an access serial number are contained in the message body of the browser control privilege gaining response. An access serial number is contained in the message body of the browser control privilege return request. A response constant is contained in the message body of the browser control privilege return response. An access serial number, a frame character string and URL are contained in the message body of the browser page display request. The frame character string is a frame identification character string which indicates URL, and the URL in this case is URL displayed on a frame indicated by a frame character string on a browser component. A response constant is contained in the message body of the page display response of the browser.

A stream reservation recording request, a stream reservation recording response, a non-stream reservation recording request, a non-stream reservation recording response, a reservation recording cancel request, a reservation recording cancel response, a reservation condition list gaining request and a reservation condition list gaining response belong to a group of the recording reservation interface messages.

Here, the stream is a software unit which has some sense with even a part thereof, however, it has no sense with only the file name thereof. A picture and a sound are examples of the stream. The non-stream is a software unit which has one sense with the overall portion from the head to the last thereof, and it has a sense with only the file name.

The stream reservation recording request is a message to request a reservation recording of a stream, and the stream reservation recording response is a response message thereto. The stream reservation recording request is transmitted to a recording reservation component (broadcast reception apparatus), and a channel and a recording start time/recording end time are included in the stream reservation recording request. When the contents of the stream reservation recording request are overlapped with a contents which have been already reserved, the fact that the request is a duplicative reservation is included in the stream reservation response. The non-stream reservation recording request is a message to request the non-stream reservation recording, and the non-stream reservation recording response is a response message thereto. The non-stream reservation recording request is also transmitted to a recording reservation component (broadcast reception apparatus), and an EIA-based station code, a recording start time/recording end time and URL of reserved language are input to the non-stream reservation recording request thus transmitted.

When the contents of the non-stream reservation recording request are overlapped with a contents which have been already reserved, the fact that the request is a duplicative reservation request is included in the non-stream reservation response. The reservation recording cancel request is a message to cancel the recording reservation which has been already made, and the reservation recording cancel response is a response message thereto. The reservation condition list gaining request is a message to request a list of recorded programs which are currently reserved, and the reservation condition list gaining response is a response message thereto. The number of programs reserved to be recorded, reservation numbers, URL after recorded (in the case of non-stream), recording start times, recording end times, etc. are contained in the reservation condition list gaining response.

A channel and start and end times each of which is composed of year, month, date, hour, minute and second are contained in the message body of the stream reservation recording request. A response constant and a reservation number allocated at a record component side are contained in the message body of the stream reservation recording response. A channel, start and end times each of which is composed of year, month, date, hour, minute and second, and URL after recording are contained in the message body of the non-stream reservation recording request. A response constant and a reservation number allocated at a record component side are contained in the message body of the non-stream reservation recording response. A reservation number to be cancelled is contained in the message body of the reservation recording cancel request, and a response constant is contained in the message body of the reservation recording cancel response.

Nothing may be contained in the message body of the reservation condition list gaining request, and the number of programs reserved to be recorded, a reservation number for each the program reserved to be recorded, URL after recording, a channel and start and end times each of which is composed of year, month, date, hour, minute and second are contained in the message body of the reservation condition list gaining response.

A stream reservation recording request with storage assignment belongs to a group of the second type recording reservation interface messages.

The stream reservation recording request with storage assignment comprises a recording reservation start time and a recording reservation end time similarly to the stream reservation recording request. In addition, the stream reservation recording request with storage assignment comprises a node ID and sub-node ID of a storage (a broadcast storing apparatus).

A component view shift request, a component view shift response, a shift request interception request, a shift request interception response, a shift request completion request and a shift request completion response belong to a group of the layout interface messages.

The component view is an information input/output portion, and it is mainly an output portion. By the shift of the component, the layout of the component on a display is shifted. In addition, a physical component may be actually shifted. As an example of the latter case, it may be considered that a speaker is shifted in a right-and-left direction and in a front-and-back direction.

The component view shift request is a message requesting a shift of a component view, and the component view shift response is a response message thereto. A node ID, a sub node ID, a start time, an end time, a coordinate on a display after the shift, etc. are contained in the component view shift request.

The component view shift request is not directly sent to a component serving as a shift target, but issued to a component having a layout interface on equipment in which the view of the component concerned is displayed. The component serving as the shift target receives a shift message from the component having the layout interface through a layout sub message. The shift request interception request is a message to intercept the shift of the component at some midpoint of the shift operation, and the shift request interception response is a response message thereto. The shift request completion request is a message to complete the shift of the component, that is, to shift the component so that the component immediately arrives the position which have been scheduled to be reached at the end time, and the shift request completion response is a response message thereto.

Contained in the message body of the component view shift request are a node ID, a subnode ID, a shift start time and a shift end time which are expressed by hour, minute and second, an identification flag representing whether each of the shift start time and the shift end time is represented by an absolute time or a relative time, the coordinate of a component after the shift, the size of a window after the shift, etc. for a component which is required to be shifted. A response constant is contained in the message body of the component view shift response. A node ID and subnode ID for a component to which the shift interception is required is contained in the message body of the shift request interception request. A response constant is contained in the shift request interception response. A node ID and subnode ID for a component to which the completion of the shift is required is contained in the message body of the shift request completion request, and a response constant is contained in the message body of the shift request.

A component shift request belongs to a group of the layout sub interface messages.

The component shift request is a message requesting a shift transmitted from a component having a layout interface to a component under the control thereof. The absolute coordinate of a shift destination on a display, the width and height of a view (window), etc. are contained in the message body of the component shift request.

Next, the operation of the components which transmit and receive the messages will be explained with reference to the accompanying drawings.

Figure 2:
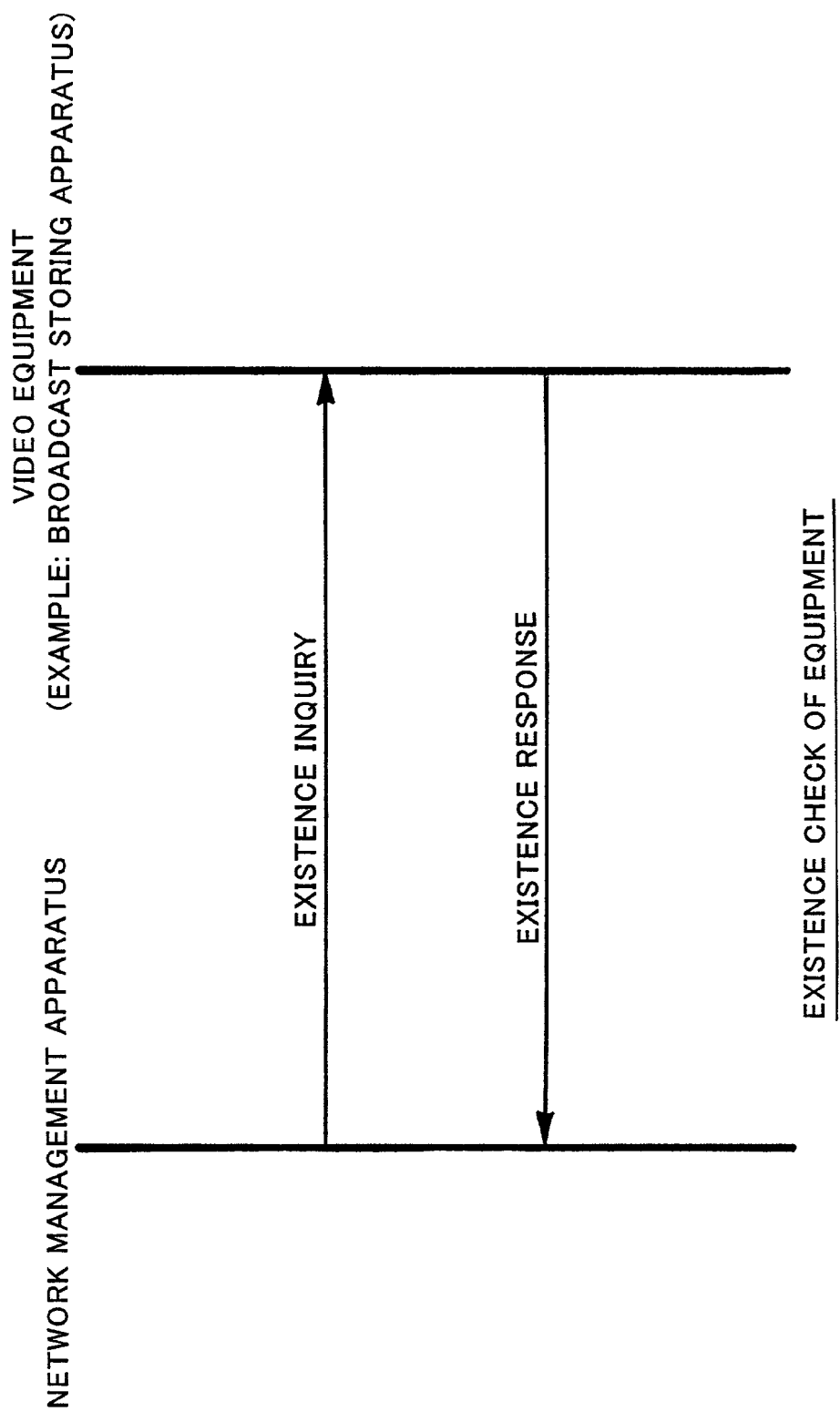
FIG. 2 is a sequence diagram showing messages when existence of equipment is confirmed.

FIG. 2 is a sequence diagram showing a message in case that existence of equipment is confirmed.

Referring to FIG. 2, network management apparatus 7 transmits an existence inquiry message to a broadcast storing apparatus in order to confirm the existence of the store portion of the broadcast storing apparatus, for example. In response to this message, the broadcast storing apparatus returns an existence response.

Figure 3:
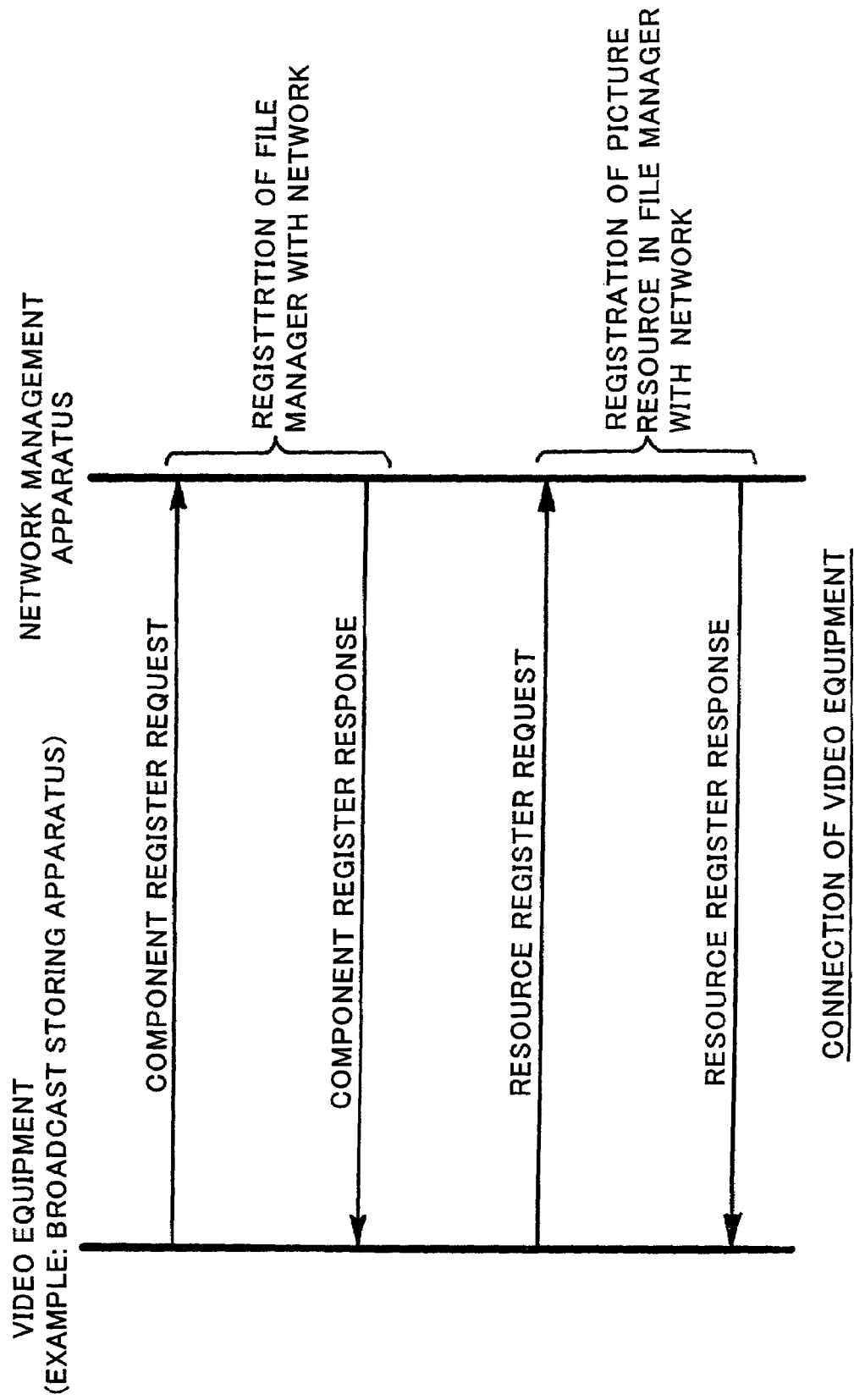
FIG. 3 is a sequence diagram of messages which are received/transmitted between a video apparatus and a network management apparatus when the video apparatus is newly connected to a network.

FIG. 3 is a sequence diagram showing a message communicated (transmitted/received) between a video apparatus and network management apparatus 7 in case that the video apparatus is newly connected to the network.

Referring to FIG. 3, when a video apparatus is newly connected to the network, the video apparatus transmits a component register request to network management apparatus 7 to request registration thereof on the network. In response to this request, network management apparatus 7 returns a component register response. If it is confirmed on the basis of the component register response that the video apparatus is registered, then the video apparatus transmits a resource register request to network management apparatus 7 so that a resource stored in the video apparatus is registered on the network. In response to this request, network management apparatus 7 registers the resource and returns a resource register response.

Figure 4:
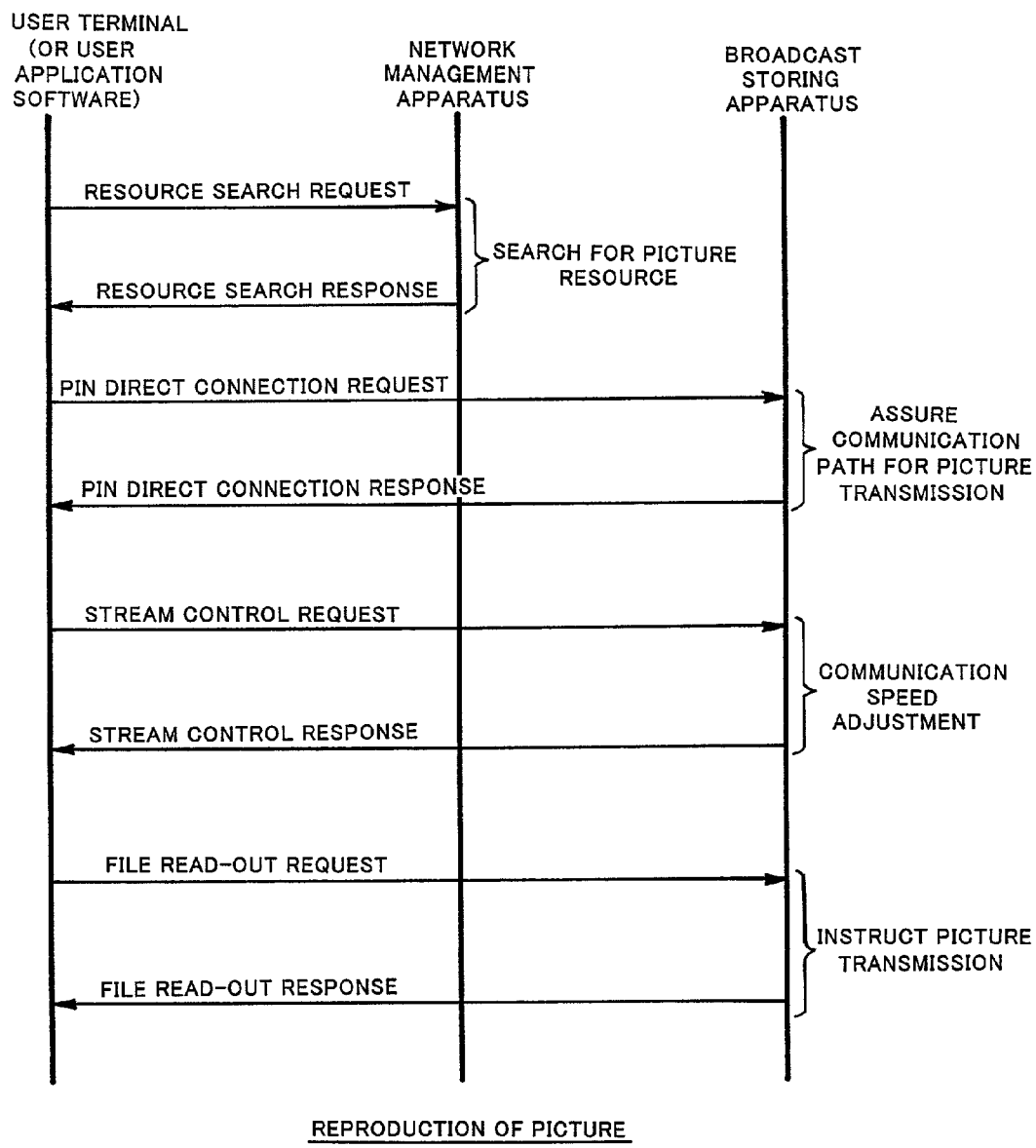
FIG. 4 is a sequence diagram of messages which are received/transmitted among a user terminal, a network management apparatus and a broadcast storing apparatus when pictures are reproduced.

FIG. 4 is a sequence diagram showing messages which are received/transmitted among a user terminal (or a user application software), network management apparatus 7 and broadcast storing apparatus 3 or 4.

Referring to FIG. 4, when there is a picture reproducing request based on a user operation, a user terminal transmits to network management apparatus 7 a resource search request concerning a video apparatus in which the picture is stored. Network management apparatus 7 returns to the user terminal a resource search response containing information as to which video apparatus stores the requested picture. Subsequently, in order to assure a communication path for picture transmission with the broadcast storing apparatus which is identified as having the picture stored therein, the user terminal transmits a pin direct connection request to the broadcast storing apparatus. The broadcast storing apparatus returns a pin direct connection response to the user terminal. If it is confirmed on the basis of the pin direct connection response that the communication path is assure, the user terminal transmits a stream control request to the broadcast storing apparatus. In response to this request, the broadcast storing apparatus returns a stream control response. Subsequently, the user terminal transmits a file read-out request to the broadcast storing apparatus. In response to this request, the broadcast storing apparatus returns a file read-out response.

Thereafter, binary transmission of picture data is performed with a pin set by the pin interface.

Figure 5:
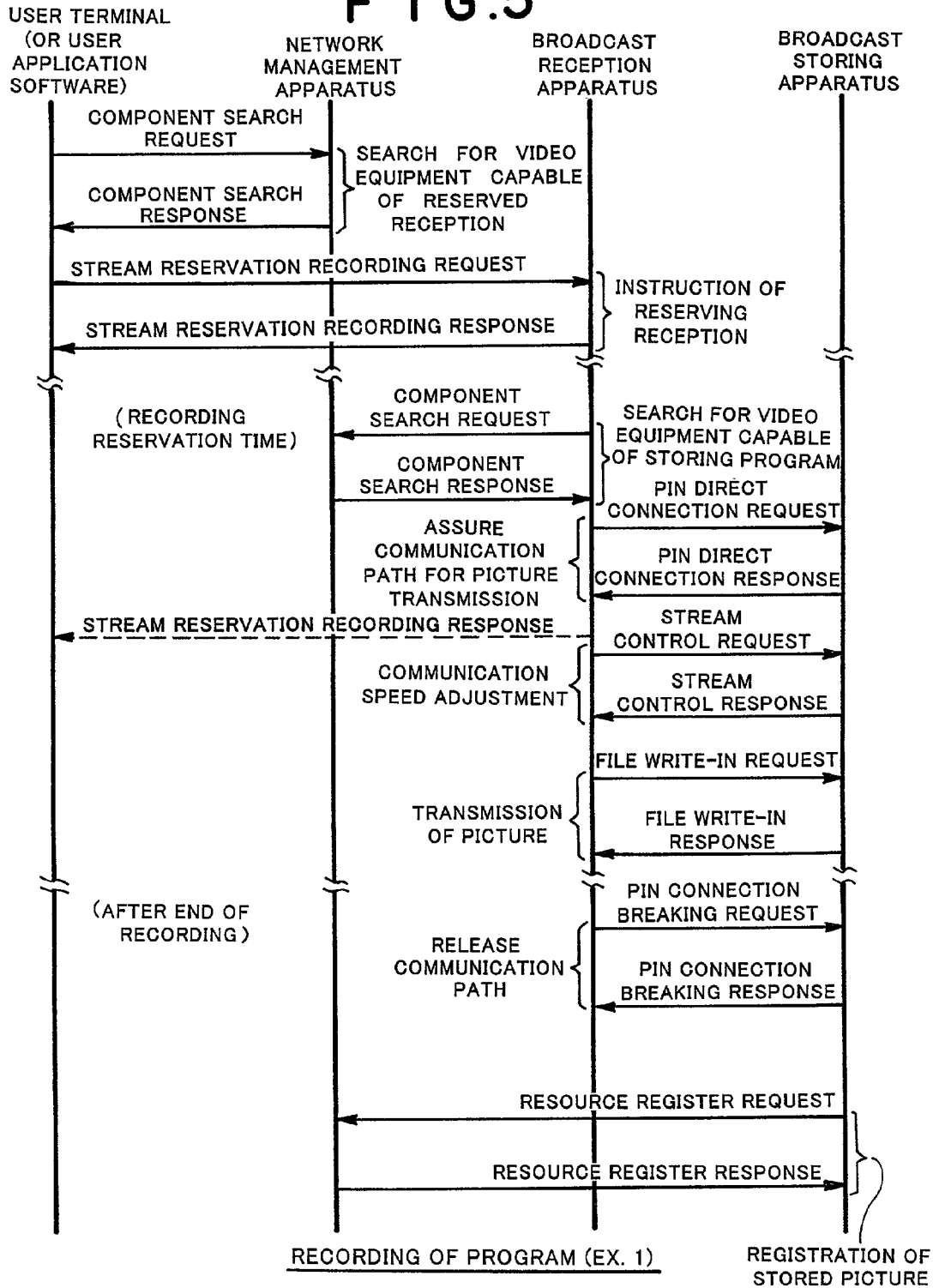
FIG. 5 is a sequence diagram of a first example of messages which are received/transmitted among a user terminal, a network management apparatus, a broadcast reception apparatus and a broadcast storing apparatus when a broadcast program is recorded.

FIG. 5 is a sequence diagrams of a first example of messages which are received/transmitted among the user terminal (or a user application software), network management apparatus 7, broadcast reception apparatus 1 or 2 and broadcast storing apparatus 3 or 4.

Referring to FIG. 5, when there is required a program recording reservation based on a user operation, the user terminal transmits to network management apparatus 7 a component search request concerning video apparatus which is able to make the program recording reservation. Network management apparatus 7 returns to the user terminal a component search response containing information as to which video apparatus (a broadcast reception equipment as a result) can make the program recording reservation. Subsequently, the user terminal transmits to the broadcast reception apparatus a stream recording reservation request so that the broadcast reception apparatus which is identified as being able to make the program recording reservation makes the reservation. The broadcast reception apparatus returns a stream reservation recording response to the user terminal.

When the reservation time comes, the broadcast reception apparatus transmits a component search request to network management apparatus 7 to search a video apparatus which can store the requested program. Network management apparatus 7 returns to the broadcast reception apparatus a component search response containing information as to which video apparatus (broadcast storing apparatus as a result) can store the program. Subsequently, in order to assure a communication path for picture transmission with a broadcast storing apparatus which is identified as being able to store the program, the broadcast reception apparatus transmits a pin direct connection request to the broadcast storing apparatus. The broadcast storing apparatus returns a pin direct connection response to the broadcast reception apparatus. Subsequently, the broadcast reception apparatus transmits a stream control request to the broadcast storing apparatus, and then the broadcast storing apparatus returns a stream control response to the broadcast reception apparatus. Subsequently, the broadcast reception apparatus transmits a file write-in request to the broadcast storing apparatus to transmit pictures. The broadcast storing apparatus returns a file write-in response to the broadcast reception apparatus, whereby transmission of the pictures is started.

When the program recording reservation is completed, the broadcast reception apparatus transmits a pin connection breaking request to the broadcast storing apparatus to release the communication path, and then the broadcast storing apparatus returns a pin connection breaking response to the broadcast reception apparatus. Subsequently, in order to register the program thus stored with network management apparatus 7, the broadcast storing apparatus transmits a resource register request containing information on the program to network management apparatus 7. Network management apparatus 7 registers the information and returns a resource register response to the broadcast storing apparatus.

The broadcast reception apparatus may exchange the component search request, the component search response, the pin direct connection request, and the pin direct connection response just after the stream reservation recording request and then send the stream reservation recording response (indicated by a broken line) to the user terminal after pin direct connection has been established instead of exchanging the component search request, the component search response, the pin direct connection request, and the pin direct connection response when a time for broadcast recording comes. In this case, the user terminal can confirm whether both of the broadcast reception apparatus and the broadcast storing apparatus can prepare for the reserved broadcast recording just after transmitting the stream reservation recording request so that the user terminal locates another broadcast reception apparatus and another broadcast storing apparatus capable of performing the reserved broadcast recording. Plural pin direct connections may be established for one component. One pin direct connection does not exclude a data transmission on another pin direct connection. Therefore, there arise no problem even if a pin direct connection is established before a reservation recording start time comes. This is realized by assigning a different port for a different pin direct connection in a case where TCP/IP is adapted for example.

Figure 6:
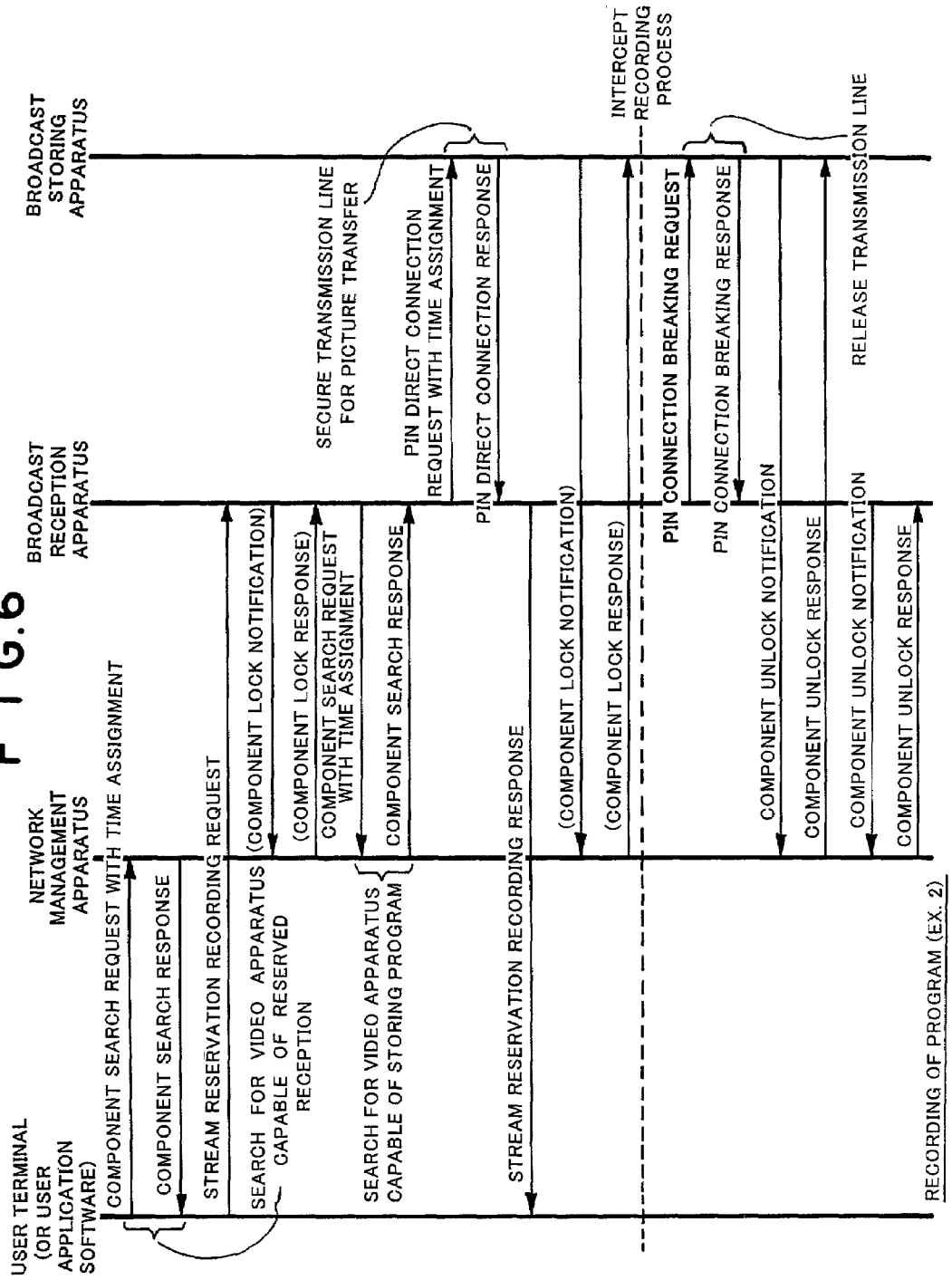
FIG. 6 is a sequence diagram of a second example of messages which are received/transmitted among a user terminal, a network management apparatus, a broadcast reception apparatus and a broadcast storing apparatus when a broadcast program is recorded.

FIG. 6 is a sequence diagrams of a second example of messages which are received/transmitted among the user terminal (or a user application software), network management apparatus 7, broadcast reception apparatus 1 or 2 and broadcast storing apparatus 3 or 4.

The network management apparatus manages reservation states for each apparatus registered therewith in a unit of second. The reservation state is expressed by one bit for each of combinations of seconds and apparatuses. Each bit expresses whether or not each apparatus is reserved for each time.

First, the user terminal (or the user application) transmits a component search request to the network management apparatus in order to search for video apparatuses capable of a reserved broadcast reception for an assigned time zone. The network management apparatus transmits a component search response to the user terminal. The user terminal obtains a list of broadcast reception apparatuses capable of the reserved broadcast reception for the assigned time zone.

Next, the user terminal transmits a stream reservation recording request to one of the broadcast reception apparatuses in the list, which is assigned by a set of a node ID and a sub-node ID. If the user terminal knows that one broadcast reception apparatus cannot perform the reserved broadcast recording by examining a value of a response constant, the user terminal sends another stream reservation recording request to another broadcast reception apparatus in the list. If all the broadcast reception apparatuses in the list cannot perform the reserved broadcast recording, the user terminal determines that the reserved broadcast recording cannot be performed.

Next, the broadcast reception apparatus capable of the reserved broadcast recording transmits a component lock notification to the network management apparatus. In the component lock notification, there is a reserved recording start time and a reserved recording end time. Next, the network management apparatus transmits a component lock response to the broadcast reception apparatus and manages the broadcast reception apparatus as not being able to accept a further reserved broadcast recording during the reservation time zone of from the recording start time to the reserved recording end time. If the broadcast reception apparatus comprises plural tuners and is capable of a further reserved broadcast reception, the broadcast reception apparatus does not transmit the component lock notification.

Next, the broadcast reception apparatus transmits a component search request with a time assignment in order to find a video apparatus capable of storing the broadcast during the time zone. Next, the network management apparatus transmits a component search response to the broadcast reception apparatus. The broadcast reception apparatus obtain a list of broadcast storing apparatuses capable of storing the broadcast during the time zone.

Next, the broadcast reception apparatus transmits a pin direct connection request with a time assignment to a broadcast storing apparatus corresponding to one of pairs each consisting of a node ID and a sub-node ID in a list in the component search response. The broadcast storing apparatus transmits a pin direct connection response to the broadcast reception apparatus. Here, if the broadcast reception apparatus knows that the broadcast storing apparatus cannot accept the reserved broadcast recording because of shortage of remaining capacity or duplication of the reserved broadcast recording time zone, the broadcast reception apparatus transmits another pin direct connection request with a time assignment to another broadcast storing apparatus in the list. If all the broadcast storing apparatus cannot accent the reserved broadcast recording, the broadcast reception apparatus determines that the reserved broadcast recording cannot be performed.

While transmitting the pin direct connection response, the broadcast storing apparatus capable of the reserved broadcast recording transmits a component lock notification to the network management apparatus. The network management apparatus transmits a component lock response to the broadcast storing apparatus.

Thereafter, at the time when the start time of the reserved broadcast recording comes, the recording starts.

In a case where the recording is intercepted by any reason before the end time of the recording, the broadcast reception apparatus which knows the occurrence of the interception via any route transmits a pin direct disconnection request to the broadcast storing apparatus. The broadcast storing apparatus transmits a pin direct disconnection response to the broadcast reception apparatus. Because the broadcast reception apparatus gets in a state capable of accepting a reserved broadcast recording, the broadcast reception apparatus transmits a component unlock notification to the network management apparatus. The network management apparatus transmits a component unlock response to the broadcast reception apparatus. Similarly, because of the same reason, the broadcast storing apparatus and the network management apparatus exchange a component unlock notification and a component unlock response.

In FIG. 6, broadcast reception apparatuses incapable of accepting the reserved broadcast recording and broadcast storing apparatuses incapable of accepting the reserved broadcast recording are not shown.

Figure 7:
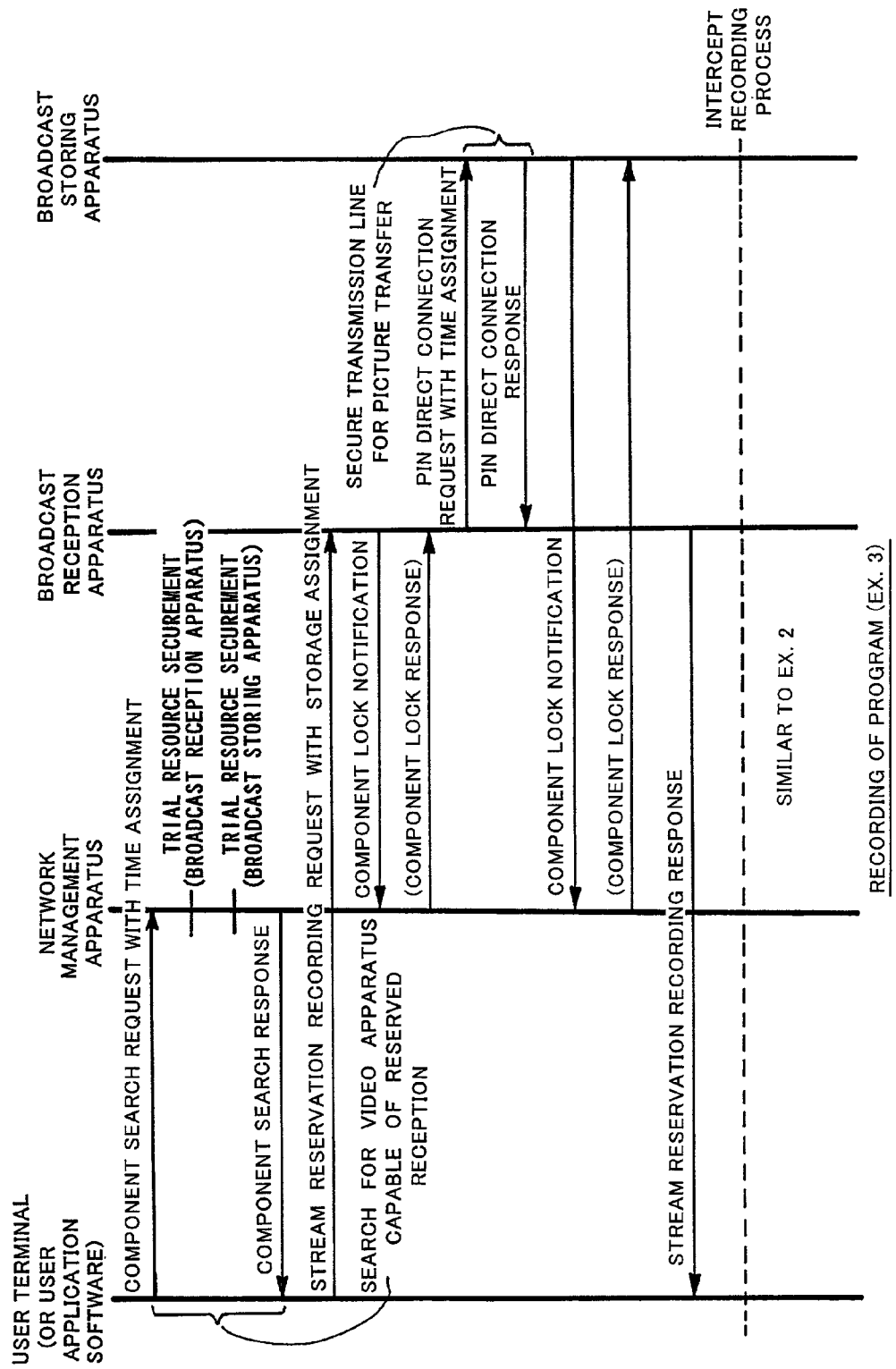
FIG. 7 is a sequence diagram of a third example of messages which are received/transmitted among a user terminal, a network management apparatus, a broadcast reception apparatus and a broadcast storing apparatus when a broadcast program is recorded.

FIG. 7 is a sequence diagrams of a third example of messages which are received/transmitted among the user terminal (or a user application software), network management apparatus 7, broadcast reception apparatus 1 or 2 and broadcast storing apparatus 3 or 4.

First, the user terminal (or the user application) transmits a component search request to the network management apparatus in order to search for video apparatuses capable of a reserved broadcast reception for an assigned time zone and video apparatuses capable of a reserved broadcast recording for an assigned time zone. The network management apparatus transmits a component search response to the user terminal. The user terminal obtain a list of broadcast reception apparatuses capable of the reserved broadcast reception for the assigned time zone and broadcast recording apparatuses capable of the reserved broadcast recording for the assigned time zone.

The video apparatuses included in the list in the component search response get in a state of "trial resource securement". The state of "trial resource securement" is a state of being secured in connection with resource for a short time of, for example, 0.01 second. The state of being secured in connection with resource is a state of being excluded from a list in a component search response in response to a component search request having a time zone concerned. A component in a state of "trial resource securement" get in a state of being secured when a component lock notification is transmitted from the component to the network management apparatus. On the other hand, if a component lock notification for the component is not transmitted to the network management apparatus, the component does not get in the state of being secured but returns in a normal state.

Next, the user terminal transmits a stream reservation recording request with a storage assignment to one of the broadcast reception apparatuses in the list, which is assigned by a set of a node ID and a sub-node ID. If the user terminal knows that one broadcast reception apparatus cannot perform the reserved broadcast recording by examining a value of a response constant, the user terminal sends another stream reservation recording request with a storage assignment to another broadcast reception apparatus in the list. If all the broadcast reception apparatuses in the list cannot perform the reserved broadcast recording, the user terminal determines that the reserved broadcast recording cannot be performed.

Next, the broadcast reception apparatus capable of the reserved broadcast recording transmits a component lock notification to the network management apparatus. In the component lock notification, there is a reserved recording start time and a reserved recording end time. Next, the network management apparatus transmits a component lock response to the braodcast reception apparatus and set the broadcast reception apparatus in a secured state. The time period of the secured state is assigned by the component search request with a time assignment. If the broadcast reception apparatus comprises plural tuners and is capable of a further reserved broadcast reception, the broadcast reception apparatus does not transmits the component lock notification.

Next, the broadcast reception apparatus transmits a pin direct connection request with a time assignment to a broadcast storing apparatus corresponding to a pair consisting of a node ID and a sub-node ID in the stream reservation recording request with a storage assignment. The broadcast storing apparatus transmits a pin direct connection response to the broadcast reception apparatus.

While transmitting the pin direct connection response, the broadcast storing apparatus capable of the reserved broadcast recording transmits a component lock notification to the network management apparatus. The network management apparatus transmits a component lock response to the broadcast storing apparatus.

The operation in the case where the recording is intercepted before the end time of the recording is similar to the operation of example 2.

In FIG. 6, broadcast reception apparatuses incapable of accepting the reserved broadcast recording and broadcast storing apparatuses incapable of accepting the reserved broadcast recording are not shown.

Figure 8:
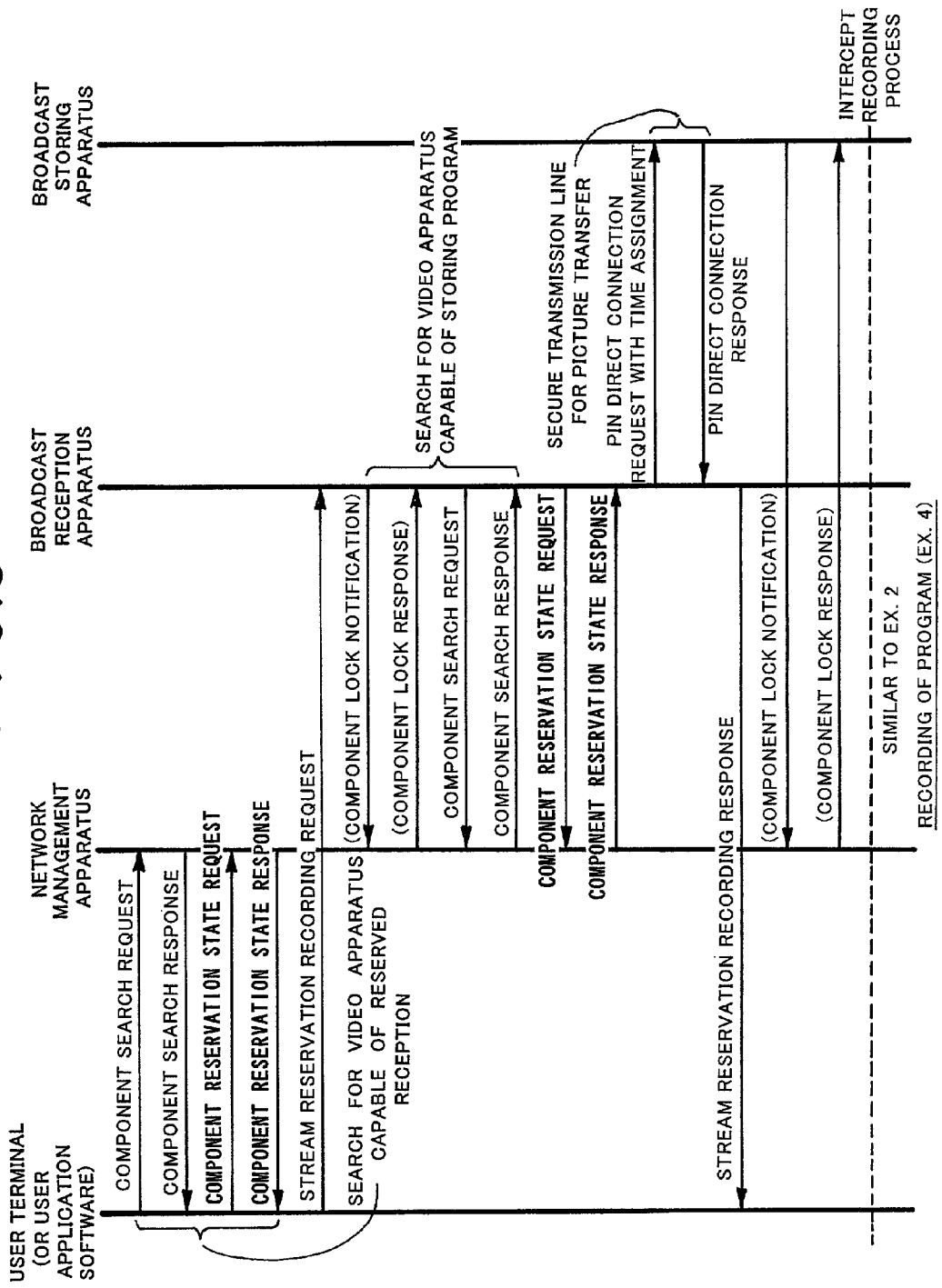
FIG. 8 is a sequence diagram of a fourth example of messages which are received/transmitted among a user terminal, a network management apparatus, a broadcast reception apparatus and a broadcast storing apparatus when a broadcast program is recorded.

FIG. 8 is a sequence diagrams of a fourth example of messages which are received/transmitted among the user terminal (or a user application software), network management apparatus 7, broadcast reception apparatus 1 or 2 and broadcast storing apparatus 3 or 4.

The fourth example is different from the second example in that a component search request, a component search response, a component reservation state request, and a component reservation state response are exchanged in the fourth example while a component search request with time assignment, and a component search response are exchanged in the second example.

A component search request does not comprise a time assignment and a component search response comprise a list of components of which each is capable of a reserved broadcast reception or a reserved broadcast recording regardless of a state of reservation thereof. On the other hand, a component reservation state response comprises a list of components capable of a reserved broadcast recording, a time zone during which each of the component can perform a reserved broadcast reception or recording. Therefore, the user terminal can determine adequate broadcast reception apparatuses and adequate broadcast storing apparatuses on the basis of the component search response and the component reservation state response. In addition, the user terminal can determine broadcast storing apparatuses and broadcast storing apparatuses which can perform a reserved broadcast reception or storing during a partial time zone out of the time zone which the user terminal desires.

Figure 9:
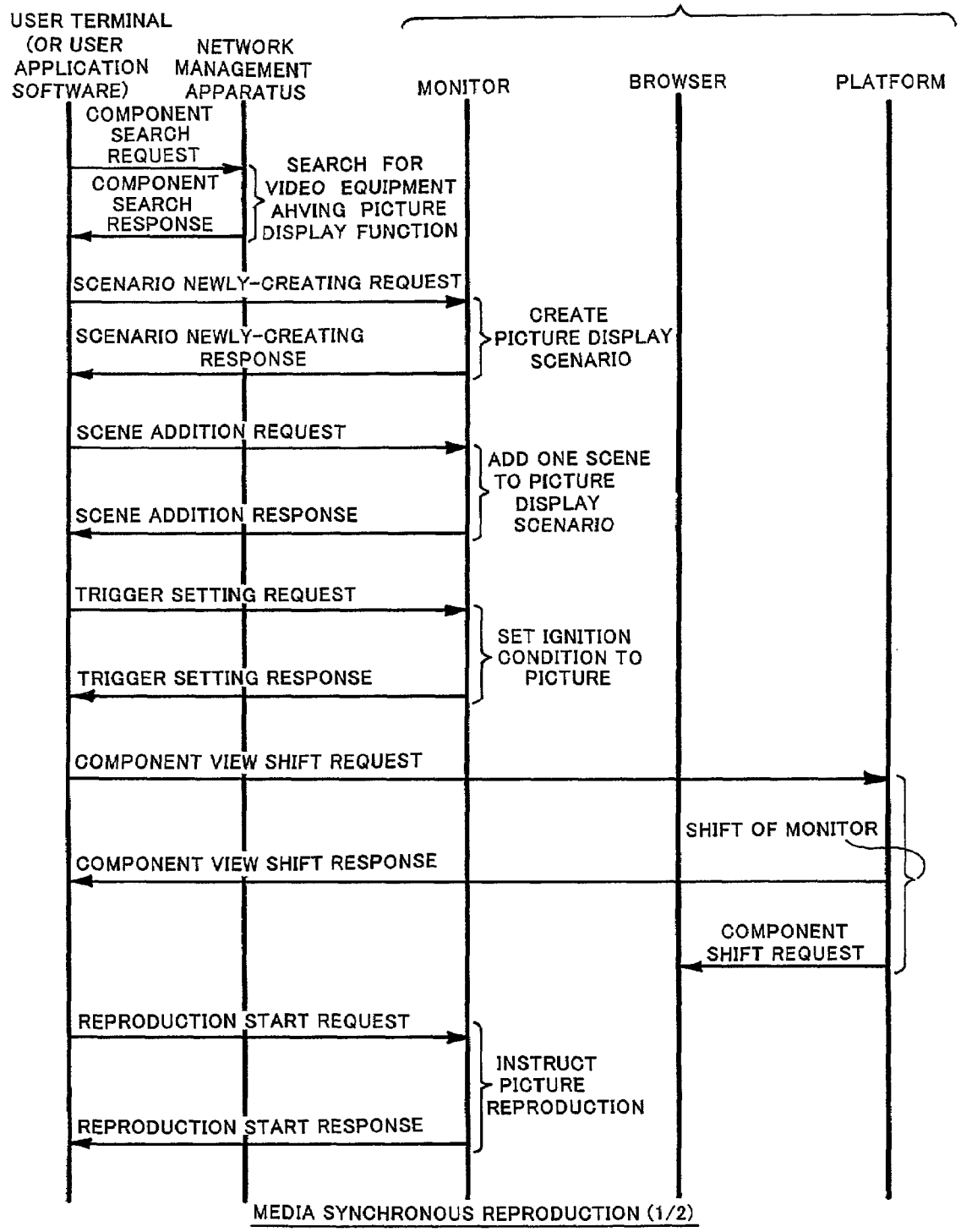
FIG. 9 is a diagram showing a former half portion of a sequence diagram of messages which are received/transmitted among a user terminal, a network management apparatus, a monitor, a browser and a platform when media synchronous reproduction is performed.
Figure 10:
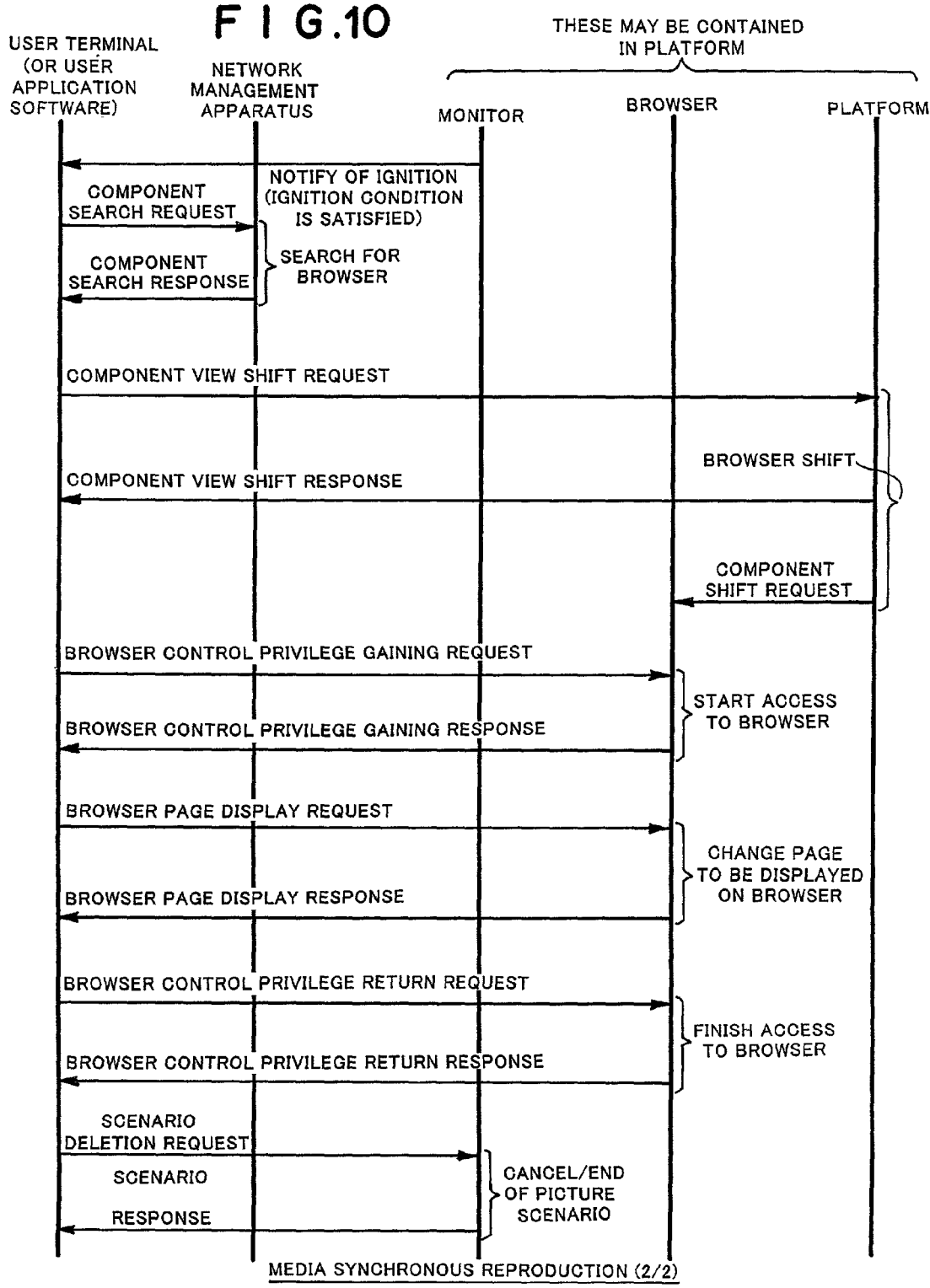
FIG. 10 is a diagram showing a latter half portion of the sequence diagram of the message which is received/transmitted among the user terminal, the network management apparatus, the monitor, the browser and the platform when the media synchronous reproduction is performed.
Figure 12:
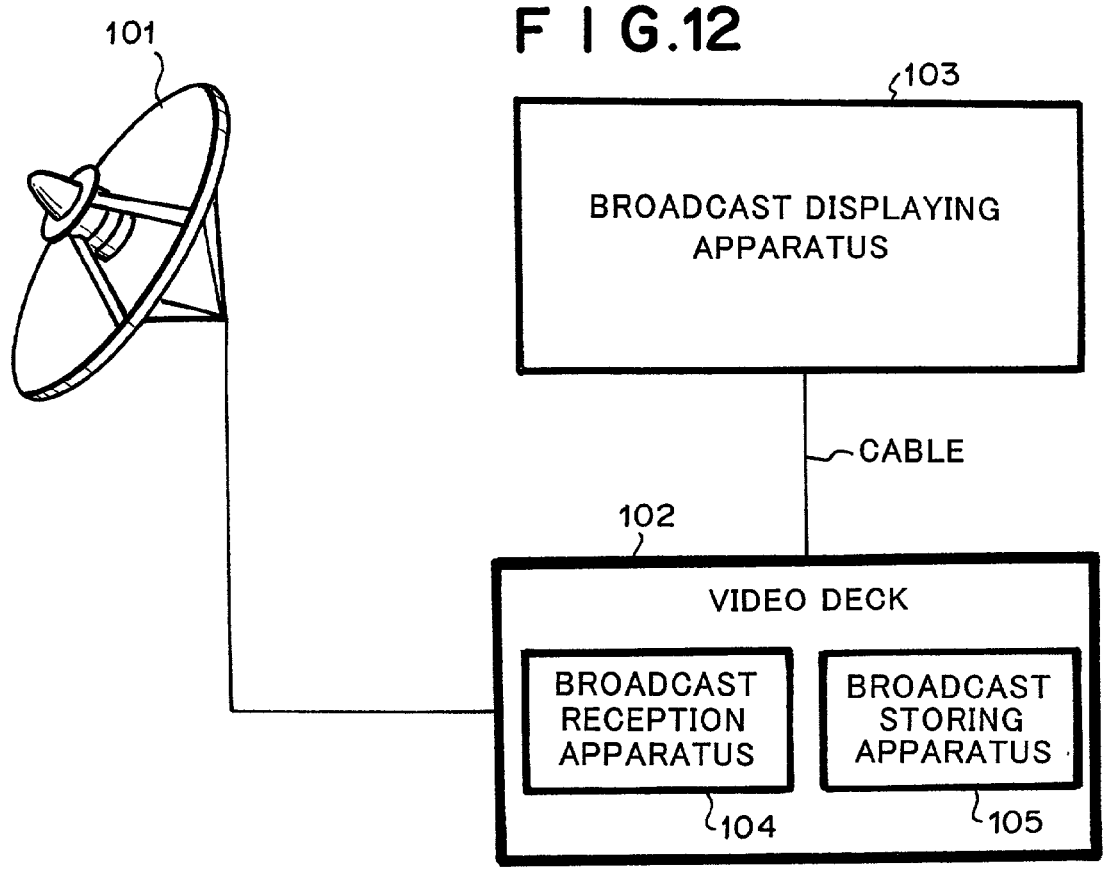
FIG. 12 is a diagram showing the construction of a broadcast reception apparatus, a broadcast storing apparatus and a broadcast displaying apparatus in a prior art.

FIGS. 9 and 10 are a sequence diagram showing messages which are transmitted/received among the user terminal (or a user application software), network management apparatus 7, a monitor (not shown in FIG. 1), a browser (not shown in FIG. 1) and a platform (or the broadcast displaying apparatus) when the media synchronous reproduction is performed. These video apparatuses are assumed to be connected to network 8. The monitor and the browser may be contained in the platform.

The media synchronous reproduction means such a reproduction that when the state of a media reproduction varies, the state of another media reproduction also varies in accordance with the variation of the state of the former media reproduction. In the case of FIG. 9, the media synchronous reproduction between a program display and a browser display is handled.

Referring to FIGS. 9 and 10, when there is a media synchronous reproduction request based on the user operation, the user terminal transmits to network management apparatus 7 a component search request concerning video apparatus having a picture display function. Network management apparatus 7 returns to the user terminal a component search response containing information as to which video apparatus (the monitor as a result) has the picture display function. Subsequently, the user terminal transmits a scenario newly-creating request to the monitor to create a scenario for picture display. The monitor returns a scenario newly-creating response to the user terminal. Here, the user terminal creates the scenario, and the monitor executes the created scenario.

Subsequently, the user terminal transmits a scene addition request to the monitor to add one scene to the picture display scenario, and in response to this request, the monitor returns a scene addition response. Thereafter, the user terminal transmits a trigger setting request to the monitor to set an ignition condition to a picture, and in response to this request the monitor returns a trigger setting response. The setting of the ignition condition to the picture means such setting that ignition occurs when a specific time in the picture comes or a specific scene appears in the picture.

Subsequently, the user terminal transmits a component view shift request to the platform to shift the monitor. In response to this request, the platform returns a component view shift response, and transmits a component shift request to the browser.

Subsequently, the user terminal transmits a reproduction start request to the monitor to instruct the picture reproduction. The monitor returns a reproduction start response to the user terminal. The monitor decodes/reproduces video signals transmitted thereto.

Subsequently, when an ignition condition is satisfied during picture reproduction, the monitor transmits an ignition notification to the user terminal. The user receiving the ignition notification transmits a component search request to network management apparatus 7 to search a browser. Network management apparatus 7 returns to the user terminal a component search response containing information as to which video apparatus (the browser as a result) has a browser function.

Subsequently, the user terminal transmits a component view shift request to the platform to shift the browser. In response to this request, the platform returns a component view shift response to the user terminal and also returns a component shift request to the browser.

Subsequently, the user terminal transmits a browser control privilege gaining request to the browser to start an access to the browser, and the browser returns a browser control privilege gaining response to the user terminal.

Subsequently, the user terminal transmits a browser page display request to the browser to change a page to be displayed ion the browser, and the browser returns a browser page display response to the user terminal.

Subsequently, when the user terminal judges that the page display is completed, the user terminal transmits a browser control privilege return request to the browser to complete the access to the browser, and the browser returns a browser control privilege return response to the user terminal.

Finally, the user terminal transmits a scenario deletion request to the monitor to finish the picture scenario, and the monitor returns a scenario deletion response to the user terminal.

As explained above, the broadcast storing and displaying apparatus according to the present invention is provided with at least one broadcast reception apparatus, at least one broadcast storing apparatus and at least one broadcast reproducing apparatus, and these apparatuses are connected to one another through a network. Further, a network management apparatus is provided on the network, and the network management apparatus holds the state information of the other apparatuses on the network at all times.

When each apparatus other than the network management apparatus communicates with another apparatus through the network to perform some processing, the apparatus concerned inquires to the network management apparatus about an apparatus with which the apparatus concerned should communicate. On the basis of the response result from the network management apparatus, each apparatus communicates with an apparatus indicated by the network management apparatus to complete desired processing. If the result of the processing by the apparatus itself changes the state thereof, the apparatus notifies the change of the state thereof to the network management apparatus.

Accordingly, on the basis of a request from a user of the broadcast storing and displaying apparatus according to the present invention, a desired apparatus can be automatically selected from video apparatuses connected to the network, and a cumbersome work of selecting a proper video apparatus by a user can be omitted.

Further, when a broadcast apparatus is added, it is sufficient to merely connect the broadcast apparatus to the network by the user of the broadcast storing and displaying apparatus according to the present invention, and no special setting is required.

What is claimed is:

1. A broadcast storing and displaying apparatus which comprises:

a network;

a network management apparatus for managing said network; and plural types of video apparatuses connected to said network, each of said video apparatuses being capable of inquiring about state information of all others of said video apparatuses by sending an inquiry to said network management apparatus, wherein each of said plural types of video apparatuses transmits the state information relating to functions or application program interfaces, service-availability and stored programs thereof to said network, said network management apparatus stores the state information of said plural types of video apparatuses, and when one of said plural types of video apparatuses inquires about the state information of the other video apparatuses to said network management apparatus, said one of said video apparatuses determines and selects, based solely on the state information of the other video apparatuses provided by said network management apparatus, a video apparatus to be a communication partner on the basis of the state information of the other video apparatuses, wherein said one of said video apparatuses makes a sole determination as to the communication partner of said one of said video apparatuses based on the state information that said network management apparatus received from the other video apparatuses and forwarded to said one of said video apparatuses, said sole determination being made without an input by a user, and wherein said sole determination includes determination of an apparatus storing a designated program on the basis of information relating to programs stored in storing apparatuses.

2. The broadcasting storing and display apparatus as claimed in claim 1, wherein there are provided a plurality of video apparatuses of the same type which are connected to said network.

3. A broadcast storing and displaying apparatus which comprises:

a network; and plural types of video apparatuses connected to said network, wherein each of said plural types of video apparatuses is capable of inquiring about state information relating to functions or application program interfaces, service-availability and stored programs of the other video apparatuses through said network to the other video apparatuses and then wherein one of said video apparatuses determines and selects, based solely on information received regarding the state information of the other video apparatuses as received by said one of said video apparatuses based on a request output by said one of said video apparatuses, a video apparatus to be a communication partner on the basis of the state information of the other video apparatuses which are obtained from the other video apparatuses, wherein said one of said video apparatuses makes a sole determination as to the communication partner of said one of said video apparatuses based on the state information provided directly to said one of said video apparatuses by the other video apparatuses, said sole determination being made without an input by a user, and wherein said sole determination includes determination of an apparatus storing a designated program on the basis of information relating to programs stored in storing apparatuses.

4. The broadcasting storing and display apparatus as claimed in claim 3, wherein there are provided a plurality of video apparatuses of the same type which are connected to said network.

5. A video apparatus connected to a network to which a network management apparatus for managing the network and plural types of video apparatuses are connected, which comprises:

means for transmitting state information relating to functions or application program interfaces, service-availability and stored programs thereof to said network; and means for inquiring about the state information of other video apparatuses to said network management apparatus and then determining and selecting a video apparatus to be a communication partner solely on the basis of the state information of said other video apparatuses which are obtained from said network management apparatus, wherein said one of said video apparatuses makes a sole determination as to the communication partner of said one of said video apparatuses based on the state information that said network management apparatus received from the other video apparatuses and forwarded to said one of said video apparatuses, said sole determination being made without an input by a user, and wherein said sole determination includes determination of an apparatus storing a designated program on the basis of information relating to programs stored in storing apparatuses.

6. The video apparatus as claimed in claim 5, wherein there are provided a plurality of video apparatuses of the same type which are connected to said network.

7. A video apparatus connected to a network to which plural types of video apparatuses are connected, which comprises:

means for transmitting state information relating to functions or application program interfaces, service-availability and stored programs thereof to said network; and means for inquiring about the state information of other video apparatuses to said other video apparatuses and then determining and selecting a video apparatus to be a communication partner solely on the basis of the state information of said other video apparatuses which are obtained from said other video apparatuses, wherein said one of said video apparatuses makes a sole determination as to the communication partner of said one of said video apparatuses based on the state information provided directly to said one of said video apparatuses by the other video apparatuses, said sole determination being made without an input by a user, and wherein said sole determination includes determination of an apparatus storing a designated program on the basis of information relating to programs stored in storing apparatuses.

8. The video apparatus as claimed in claim 7, wherein there are provided a plurality of video apparatuses of the same type which are connected to said network.

9. A broadcast receiving and storing apparatus which comprises:
 a broadcast receiving component for receiving a broadcast program;
 broadcast storing components for storing broadcast programs;
 a managing component for managing state information relating to functions or application program interfaces, service-availability and stored programs of said broadcast storing components; and
 a network for connecting said broadcast receiving component, said broadcast storing components and said managing component;
 wherein said managing component stores the state information; and
 said broadcasting receiving component selects one or more broadcast storing components from said broadcast storing components as broadcast storing components which store a program which said broadcasting receiving component receives, solely on the basis of the state information obtained from said managing component through said network,
 wherein said broadcast receiving component makes a sole determination as to the communication partner of said broadcast receiving component based on the state information that said managing component received from said broadcast storing components and forwarded to said broadcast receiving component, said sole determination being made without an input by a user,
 wherein said sole determination includes at least one of determination of a component to receive a designated program on the basis of information relating to receivable programs of receiving components and determination of a component to store the designated program on the basis of information relating to free storing capacities of storing components.

10. A broadcast receiving and storing apparatus which comprises:
 a broadcast receiving component for receiving a broadcast program;
 broadcast storing components for storing broadcast programs; and
 a network for connecting said broadcast receiving component, and
 said broadcast storing components;
 wherein said broadcasting receiving component selects one or more broadcast storing components from said broadcast storing components as broadcast storing components which store a program which said broadcasting receiving component receives, solely on the basis of state information relating to functions or application program interfaces, service-availability and stored programs obtained from said broadcast storing components through said network,
 wherein said broadcast receiving component makes a sole determination as to the communication partner of said broadcast receiving component based on the state information that said broadcast receiving component received directly from said broadcast storing components, said sole determination being made without an input by a user,
 wherein said sole determination includes at least one of determination of a component to receive a designated program on the basis of information relating to receivable programs of receiving components and determination of a component to store the designated program on the basis of information relating to free storing capacities of storing components.

11. The broadcast storing and displaying apparatus as claimed in claim 1, wherein the communication partner is automatically selected by the one of the video apparatuses based on information concerning currently available resources for each of the other apparatuses that is provided to the one of the video apparatuses by the network management apparatus, and wherein the network management apparatus does not select the communication partner for the one of the video apparatuses.

12. The broadcast storing and displaying apparatus as claimed in claim 11, wherein the currently available resources of each of the other video apparatuses do not include resources that are currently assigned to any of the video apparatuses.

13. The broadcast storing and displaying apparatus as claimed in claim 3, wherein the communication partner is automatically selected solely by the one of the video apparatuses based on information concerning currently available resources for each of the other apparatuses that is provided to the one of the video apparatuses.

14. The broadcast storing and displaying apparatus as claimed in claim 13, wherein the currently available resources of each of the other video apparatuses do not include resources that are currently assigned to any of the video apparatuses.

15. A broadcast storing and displaying apparatus as claimed in claim 1,
 wherein, when another video apparatus is newly connected to said network, said another video apparatus automatically outputs on the network, without first being requested to do so by any other apparatus, information concerning the functions or application program interfaces, the service-availability and the stored programs of said another video apparatus.

16. A broadcast storing and displaying apparatus as claimed in claim 3,
 wherein, when another video apparatus is newly connected to said network, said another video apparatus automatically outputs on the network, without first being requested to do so by any other apparatus, information concerning the functions or application program interfaces, the service-availability and the stored programs of said another video apparatus.

17. The video apparatus as claimed in claim 8, wherein the plurality of video apparatuses of the same type correspond to a plurality of video storing apparatuses,
 wherein another of the plural types of video apparatuses corresponds to a video reception apparatus, and
 wherein the video reception apparatus receives the corresponding state information from each of the plurality of video storing apparatuses when a video program is received by the video reception apparatus, in order to determine an optimal one of the plurality of video storing apparatuses to store the video program therein and to thereby become the communication partner of the video reception apparatus.

18. The video apparatus as claimed in claim 8, wherein the plurality of video apparatuses of the same type correspond to a plurality of video storing apparatuses,
  wherein another of the plural types of video apparatuses corresponds to a video display apparatus, and
  wherein the video display apparatus receives the corresponding state information from each of the plurality of video storing apparatuses when a command is received by the video display apparatus to display a particular program, and
  wherein a particular one of the plurality of video storing apparatuses in which the particular program is found to be stored therein is assigned the communication partner with the video display apparatus, in order to display the particular program.

19. A video apparatus connected to a network to which plural types of video apparatuses are connected, said video apparatus comprising:
  means for transmitting state information relating to stored programs thereof to said network; and
  means for inquiring about the state information of other video apparatuses to said other video apparatuses and then determining and selecting a video apparatus to be a communication partner solely on the basis of the state information of said other video apparatuses which are obtained from said other video apparatuses,
  wherein video apparatus makes a sole determination as to the communication partner of said video apparatus based on the state information provided directly to said video apparatus by said other video apparatuses, said sole determination being made without an input by a user,
  wherein there are provided a plurality of video apparatuses of the same type which are connected to said network,
  wherein the plurality of video apparatuses of the same type correspond to a plurality of video storing apparatuses,
  wherein another of the plural types of video apparatuses corresponds to a video display apparatus,
  wherein the video display apparatus receives the corresponding state information from each of the plurality of video storing apparatuses when a command is received by the video display apparatus to display a particular program, and
  wherein a particular one of the plurality of video storing apparatuses in which the particular program is found to be stored therein is assigned as the communication partner with the video display apparatus, in order to display the particular program.

20. The broadcasting storing and displaying apparatus as claimed in claim 1, wherein said one of said video apparatuses selects the communication partner corresponding to another of said video apparatuses for a particular time frame, and after the particular time frame elapses, yet another of said video apparatuses is capable of selecting the communication partner corresponding to said another of said video apparatuses.

21. The broadcasting storing and displaying apparatus as claimed in claim 20, wherein said another of said video apparatuses outputs a lock signal during the particular time frame in response to any inquiries from other apparatuses in said network concerning whether said another video apparatus can become a communication partner, and wherein said another of said video apparatuses outputs an unlock signal to all other of said video apparatuses in said network immediately after the particular time frame has elapsed.

* * * * *